United States Patent
Rabinovitz

(10) Patent No.: US 6,856,508 B2
(45) Date of Patent: *Feb. 15, 2005

(54) MODULAR DATA STORAGE DEVICE ASSEMBLY

(76) Inventor: Josef Rabinovitz, 20400 Plummer St., Chatsworth, CA (US) 91311

( * ) Notice: Subject to any disclaimer, the term of this patent is extended or adjusted under 35 U.S.C. 154(b) by 0 days.

This patent is subject to a terminal disclaimer.

(21) Appl. No.: 10/317,037

(22) Filed: Dec. 9, 2002

(65) Prior Publication Data

US 2004/0057203 A1 Mar. 25, 2004

Related U.S. Application Data

(63) Continuation-in-part of application No. 10/252,961, filed on Sep. 23, 2002, now abandoned.

(51) Int. Cl.[7] .................................................. G06F 1/16
(52) U.S. Cl. ..................... 361/685; 312/223.2; 709/238; 248/682
(58) Field of Search ................................ 361/679–687, 361/724–727; 312/223.1–223.6; 709/237, 238; 248/682–683

(56) References Cited

U.S. PATENT DOCUMENTS 6,487,080 B2 * 11/2002 Robbins et al. ............. 361/727

* cited by examiner

Primary Examiner—Hung Van Duong
(74) Attorney, Agent, or Firm—W. Edward Johansen

(57) ABSTRACT

A modular data device assembly includes a chassis that has an open front and a back. The chassis also has exterior dimensions that correspond to the dimensions of an industry standard drive bay. The chassis further has a plurality of slots that are disposed inside the chassis. The modular data device also includes a plurality of disk data storage devices, a backplane, and a connector. Each disk data storage device is disposed in one of the plurality of slots. The backplane is disposed in the back of the chassis. The backplane has a plurality of connectors which are mechanically coupled thereto and each of which is connected to one of the disk data storage devices. The power source connector is mechanically and electrically coupled to the backplane.

6 Claims, 21 Drawing Sheets

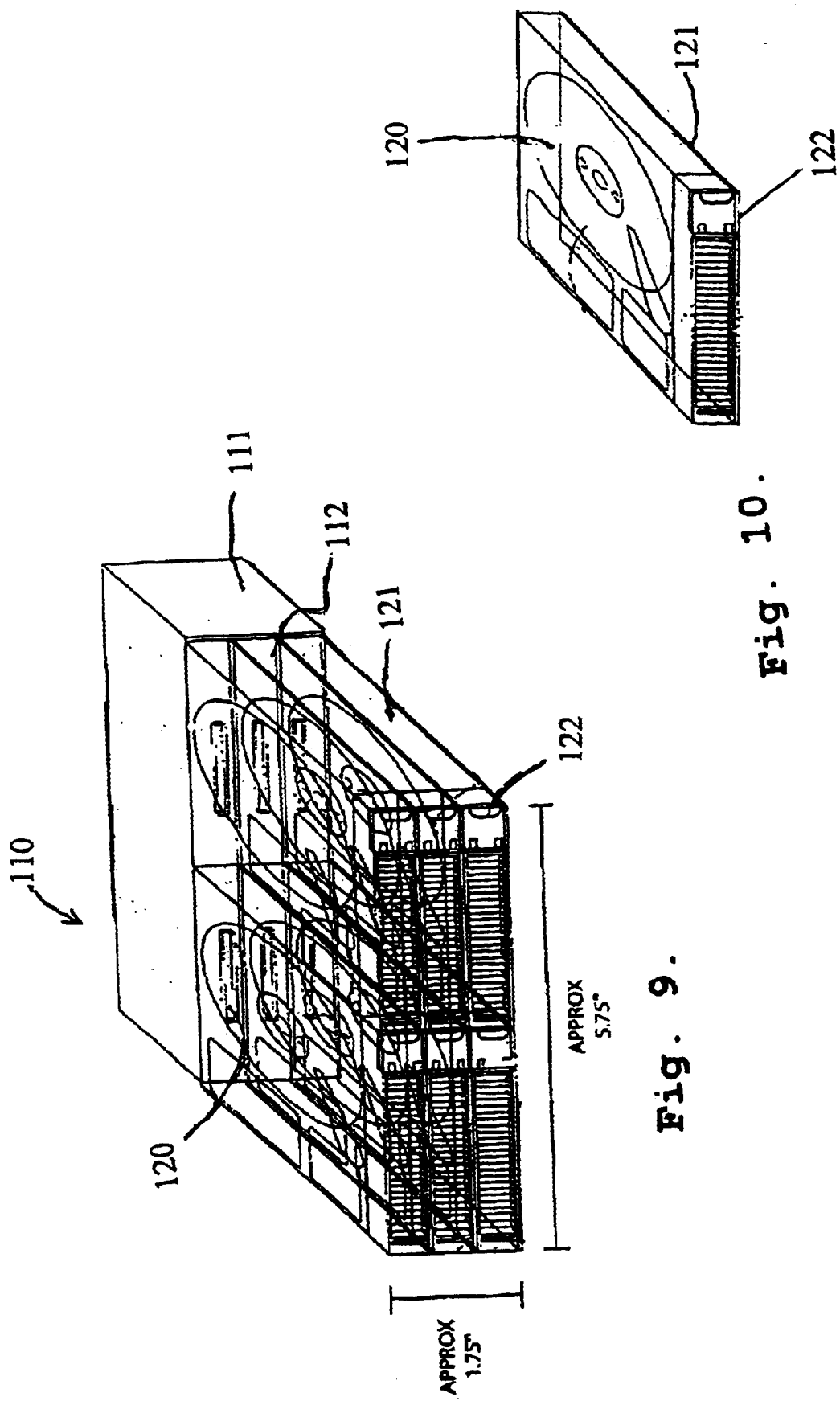

MODULAR DATA STORAGE DEVICE ASSEMBLY

This is a continuation-in-part of an application filed Sep. 23, 2002 under Ser. No. 10/252,961 now abandoned.

BACKGROUND OF THE INVENTION

1. Field of the Invention

The present invention relates to an arrangement for mounting, connecting, cooling shielding and providing removability for disk data storage devices in a computer and more particularly to a modular data device assembly adapted to mount in an industry standard size slot.

2. Description of the Prior Art and Related Information

U.S. Pat. No. 5,822,184 teaches a modular data device assembly for a computer is disclosed that has a housing that is designed to fit into a conventional, industry standard size expansion bay. Individual plug-in data storage devices such as hard disk drives or CD-ROM drives are disposed vertically in a stacked formation within the housing. A motherboard with plug-in connectors to which the drives are connected allows easy replacement of defective data devices, which devices slide in or out. The disk drives and modular data device assemblies may be arrayed in series or in parallel to a controller. By its modular structure and redundant storage functions, the present invention benefits from what is known as Redundant Array of Independent Disks principle.

There have been a number of attempts at making the components of a computer easily replaceable and interchangeable. There has been a rise in popularity of modular components and the hardware to adapt the replaced component to a conventional computer.

U.S. Pat. No. 5,227,954 teaches a mounting arrangement that allows drives of different sizes to be mounted in a drive dock. Specifically, it discloses hardware necessary to mount, for example, full height, half height, or third height drives in a conventional size drive dock. To that end, the device provides mounting plates that have upper and lower ridges for mounting a single disk drive of varying size within the single drive dock.

U.S. Pat. No. 5,222,897 teaches a circuit board inserter/ejector system for inserting a circuit board into a backplane in a chassis and for ejecting the circuit board from the backplane of the chassis. The inserter/ejector system can be used with a magnetic disk drive to facilitate insertion and removal thereof within a computer.

U.S. Pat. No. 5,067,041 teaches an apparatus for reducing electromagnetic radiation from a computer device. The apparatus includes an electrically conductive housing and a non-conductive drive mounting structure situated within the housing. The drive mounting structure includes a plurality of bays in communication with an opening in the housing, and an electrically conductive retainer that is situated over the opening to hold the disk drives in the bays.

U.S. Pat. No. 5,224,019 teaches a modular computer chassis which includes a main chassis to which a motherboard is attached and a sub-chassis attachable to the main chassis. The sub-chassis holds at least one computer component and is electrically connected to the motherboard. In this manner, the computer component is separable from the main chassis by removing the sub-chassis.

U.S. Pat. No. 5,309,323 teaches a removable electrical unit with combined grip and release mechanism. Each of the removable disk drives is mountable into a corresponding device bay in front of the subsystem chassis. Each removable disk drive incorporates a soft stop and release mechanism.

U.S. Pat. No. 5,224,020 teaches a modular electrical apparatus that includes a plurality of customer removable electrical devices such as disk drives. The devices and support units are all blind pluggable into a removable central electrical distribution unit.

U.S. Pat. No. 5,006,959 and U.S. Pat. No. 5,119,497 teach a computer apparatus with modular components that includes segregated functional units like a disk array, various plug-in card packages, power/fan unit, and a motherboard.

Another goal for moving towards modular computer components is to improve reliability. One concept in the field of disk drives is known as Redundant Array of Independent Disks (RAID). A number of disk drives are interconnected in an array for redundant storage of data. Failure of one disk drive does not destroy irreplaceable data. An example of the RAID concept is disclosed in U.S. Pat. No. 4,754,397 teaches a housing array for containing a plurality of hardware element modules such as disk drives, a plurality of modularized power supplies, and plural power distribution modules, each being connected to a separate source of primary facility power. Each module is self-aligning and blindly installable within the housing and may be installed and removed without tools, without disturbing the electrical cabling within the cabinet, and automatically by a maintenance robot. Despite the advances in designing modular components and associated hardware for computers, there is still a need for a modular component that easily adapts to conventional size restraints, yet benefits from RAID concepts.

U.S. Pat. No. 6,445,586 teaches an apparatus for a mainframe that has redundant extractable devices that are arranged in the mainframe of the IU specification for industrial computers or servos. The apparatus comprises a main body having at least two receiving spaces with respective openings at one end; closing ends of the two receiving spaces is arranged with a circuit board; two extractable units arranged within the receiving spaces and connected; to the circuit board; a front frame and a rear frame being installed at the main body. The two extractable units are extractable from the two openings so as to be connected to the circuit board. Moreover, the two extractable units are mounted to the main body and the main body is extractable in the computer mainframe, and thus an apparatus for a mainframe having redundant extractable devices is formed.

U.S. Pat. No. 6,385,667 teaches an interfacing system facilitating user-friendly connectivity in a selected operating mode between a host computer system and a flash memory card. The interfacing system includes an interface device and a flash memory card. The interfacing system features significantly expanded operating mode detection capability within the flash memory card and marked reduction in the incorrect detection of the operating mode. The interface device includes a first end for coupling to the host computer and a second end for coupling to the flash memory card, while supporting communication in the selected operating mode that is also supported by the host computer system. The flash memory card utilizes a fifty-pin connection to interface with the host computer system through the interface device. The fifty-pin connection of the flash memory card can be used with different interface devices in a variety of configurations such as a universal serial mode, PCMCIA mode, and ATA IDE mode. Each of these modes of operation requires different protocols. Upon initialization with the interface device, the flash memory card automatically detects the selected operating mode of the interface device and configures itself to operate with the selected operating mode. The operating mode detection is accomplished by sensing unencoded signals and encoded signals. The encoded signals are encoded with a finite set of predetermined codes. Each predetermined code uniquely identifies a particular operating mode.

U.S. Pat. No. 6,446,148 teaches a protocol for expanding control elements of an ATA-based disk channel that supports device command and data information issued over the channel to a number of peripheral devices coupled to the channel. In addition, channel command circuitry issues channel commands which control channel related functional blocks, each of which perform non device-specific channel related functions. The channel commands are interpreted by the channel and are not directed to peripheral devices coupled thereto. Channels commands include identification indicia that distinguish a channel command from a device command.

U.S. Patent Application 20020087898 teaches an apparatus that facilitates direct access to a serial Advanced Technology Attachment (ATA) device by an autonomous subsystem in the absence of the main operating system (OS).

U.S. Pat. No. 6,201,692 teaches a disk drive enclosure that houses a mix of "slim" and "half high" disk drive sizes in almost any order. The enclosure includes at least thirteen equally spaced pairs of guide rails. Each pair of rails includes one rail on one side panel of the enclosure, and the other rail of the other side panel of the enclosure. Each pair of guide rails defines a boundary of a "slot," such that twelve slots are defined between thirteen pairs of guide rails. Groups of slots are defined wherein each group includes six contiguous slots. For each group of six slots, four connectors are included on a back panel of the enclosure. Within each group of six slots, the four connectors are positioned within the first, third, fourth and fifth slots, and no connectors are positioned in the second and sixth slots. A "no go" tab is also placed, adjacent the leading edge of one of the side panels of the enclosure, in the second and sixth slots to prevent the insertion of the rails of a disk drive in these slots. A removable back panel "shuttle" is included, which can be replaced with a different shuttle to easily and independently convert the enclosure to receive a different type of disk drive.

U.S. Pat. No. 6,325,353 teaches a disk drive carrier that inserts a disk drive into a peripheral bay chassis. The disk drive carrier includes a base for receiving a disk drive into and a latching mechanism that is rotatably attached to the base. The rotatably mount permits a lever to rotate between an open position and a closed position. The lever includes a lower engagement point and an upper engagement point. The disk drive carrier can additionally include a downwardly movable release tab attached to the upper engagement point facilitating release of the engagement point from a P-Bay chassis. The disk drive carrier can also include an electromagnetic interference (EMI) shield to create a tight EMI seal in the front of a P-Bay chassis slot.

U.S. Pat. No. 6,188,571 teaches an apparatus for a mass storage subsystem, such as a RAID array, that includes a housing which defines first and second cavities with the first cavity housing an array controller such as a RAID controller. The second cavity houses a plurality of substantially conventional IDE drives conforming to the 3.5" form factor. The array is configured to maximize cooling of the array controller and the drives within the extremely small space defined by the housing.

U.S. Pat. No. 6,101,459 teaches a cooling system for a high-end server that includes four hot-pluggable fans plugged into a fan control board. The fans are arranged in two groups, with each group having two fans, one behind the other. One of the groups of fans is used to cool the processor boards and the other group is used to cool the system I/O board slots. Under normal operation one fan from each group is active. The other fan freewheels in order to provide redundancy. A fan control board delivers power to each of the fans and further provides a signal, responsive to temperature sensors, to each of the fans to control their speeds. Each of the fans provides a fan fault signal and a fan not present signal to the fan control board. The temperature sensors are placed proximate the processors and I/O components to monitor the operating temperatures thereof, and communicate the respective temperatures back to the fan control board. An operating system is utilized to drive the fan controller but can be overridden by the fan controller during critical conditions. An air ramp is positioned between the processors to help direct the flow of air generated by the fans onto some of the processors. Additionally, each of the fans are configured with a quick installment device to facilitate single-hand insertion and removal of the fans from the computer system. Networks serve the purpose of connecting many different personal computers, workstations, or terminals to each other, and to one or more host computers, printers and file servers so that expensive computing assets, programs, files and other data may be shared among many users. In a network utilizing a client/server architecture, the client (personal computer or workstation) is the requesting machine and the server is the supplying machine, both of which may preferably be connected via the network, such as a local area network (LAN), wide area network (WAN) or metropolitan area network (MAN). This is in contrast to early network systems that utilized a mainframe with dedicated terminals. In a client/server network, the client typically contains a user interface and may perform some or all of the application processing and, as mentioned above, can include personal computer or workstations. The server in a client/server network can be a high-speed microcomputer or minicomputer and in the case of a high-end server can include multiple processors and mass data storage such as multiple CD-ROM drives and multiple hard drives, preferably with redundant array of Independent Disks protection. An exemplary server such as a database server maintains the databases and processes requests from the client to extract data from or update the database. An application server provides additional business processing for the clients. The network operating system, the database management system and transaction monitor are responsible for the integrity and security of the server. Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use. As can be appreciated, many businesses are highly dependent upon the availability of their client/server network systems to permit essential network services and functions to be carried out. As client/server network systems become increasingly essential to the everyday operations of such businesses, additional steps need to been taken in the design and construction of the server in the client/server network system to ensure its continuous availability to the clients. That is to say, in the design and construction of a server, steps need to be taken to ensure that the server can be operated with little or no downtime. It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removability of modular components allows for better overall serviceability of the computer system that is a distinct advantage. For example, a defective power supply in the server generally requires prompt replacement in order to limit downtime. Modular components and connectors facilitate prompt replacement and are thus popular in many computer designs. Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-plug-ability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-plugable components may include storage or disc drives, drive cages, fans, power supplies, system I/O boards, control boards, processor boards, and other subassemblies. The ability to remove these constituent components without having to power down the server allows for better overall serviceability of the system, which is a distinct advantage to both the user and the maintenance technician. Component redundancy has also been recognized as an important design consideration in ensuring that a server will operate with little or no downtime. Essentially, component redundancy is typically provided in a system to better ensure that at least one of the redundant components is operable, thereby minimizing the system down time. With component redundancy, at least two components are provided that can perform the same function, such that if one of the components becomes faulty for some reason, the operation fails over to the redundant component. When at least one of the redundant components is operable, continued operation of the computer system is possible even if others of the redundant components fail. To further enhance reliability and serviceability, redundant components have been made hot plugable. Dynamic reconfiguration of a server system can also be accomplished by providing upgradable modular components therein. As can be readily appreciated, this objective can be accomplished by the addition or substitution of components having different circuits, preferably updated or upgraded, disposed within. When components are redundant and hot plugable, reconfiguration of the server is often possible without taking the server offline. Another important design aspect with respect to providing redundant and hot plugable components in a server system is to ensure and maintain a safe working environment while the server is operating and being repaired or upgraded. When the system components are swapped or upgraded, the exposure of hot connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic subsystems thereof. In existing client/server network systems it is often difficult to obtain, in a timely manner, important diagnostic data and information corresponding to a component failure in order to facilitate the quick serviceability of the server. Therefore, it can be appreciated that the more information that can be readily provided to locate a defective component or problem with the server, the better the optimization of the amount of time the server is up and running. Although the cooling of computer systems has always been a concern with computer designers to maintain high availability, the form factor of the chassis and the high demands for improved reliability of the client/server network systems with ever-increasing microprocessor power dissipation and system power consumption have created additional problems with cooling system design, especially in temperature monitoring and temperature control. In fact, many of the new computer processors have been designed to include a heat sink to help dissipate the generated heat. Not only are the high-end servers utilizing the newer high-powered processors, but are also utilizing multiple processors therein creating even more heat within the system. One proposed solution was to just use higher speed, cooling fans, however, higher speed fans created increased noise levels of operation. There is a need for a cooling system in a computer system that produces high efficiency cooling, minimizes system down time, and yet maintains a low noise level during operation.

U.S. Pat. No. 6,282,087 teaches an assembly which includes a slot in a peripheral device carrier and a tab in a housing for peripheral devices. The assembly provides a structure for retaining compatible peripheral devices in a computer system, and for preventing damage to connectors when an attempt is made to install an incompatible peripheral device. The peripheral devices include a first connector portion for electronically coupling the peripheral device to a processor in a computer system. The peripheral device is installed in the peripheral device carrier that includes a slotted side member and a front member. The slot may be located at one end of the side member, or the side member may be shortened or truncated to avoid the tab when the device carrier is inserted. The side member is attached to the front member thereby forming a portion of a frame for receiving the peripheral device. The housing includes a bay having a second connector portion and at least one opening for receiving the peripheral device carrier. The bay further includes a tab positioned to engage the slotted side member when the peripheral device carrier is inserted in the bay, thereby allowing the first connector to mate with the second connector. Computer systems including personal computers, workstations, servers, and embedded systems typically include a motherboard on which most of the fixed internal processing circuitry of the computer is mounted. While working memory (such as random access memory or RAM) may be mounted on the motherboard, permanent memory devices typically are not. Many computer systems are designed to have multiple peripheral devices, including memory devices, included in the system. A typical personal computer system includes a processor with associated memory, control logic, and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives and/or digital video/versatile disk (DVD) drives. Additionally, computer systems often have the capability to interface with external enclosures that include additional peripheral devices. One or more data busses are coupled to connectors that mate with connectors on the peripheral devices to enable electrical communication between the peripheral devices and the rest of the computer system. Several computer systems are often connected to a central network server including one or more mass storage devices. Multiple disk drives can be configured to co-operate advantageously using technology generally known as redundant array of independent disks (RAID). RAID systems are particularly useful in the network servers because they provide data redundancy, such that if a single disk drive fails, the data stored thereon can be reconstructed from the data stored on the remaining disks. In the most sophisticated network servers and RAID systems, a failed disk drive can be replaced and the data thereon restored by software without interrupting the server's operation. In so-called "hot-plugging," the failed disk drive is removed and a new one installed in its place without cutting off the power to the drive or server, and without rebooting the server. Similarly, if storage space becomes limited, disk drives can be added or upgraded without interrupting system operation. A disk drive with this capability is often referred to as "hot-plugable." One of the problems with the use of removable disk drives arises when a user attempts to install a carrier including a hard drive or other peripheral device in a slot wherein the internal connector in a peripheral device bay is not compatible with the connector on the peripheral device. If the peripheral device connector does not mate properly with the internal connectors in the bay, the user may jam the carrier more forcefully in the bay, which could result in damage to the connector assemblies or to the device carrier. It is therefore desirable to provide carrier and bay structures that will prevent a user from damaging a peripheral device and/or connectors in the bay when attempting to install a device having an incompatible connector.

Another problem arises when a user attempts to utilize a peripheral device carrier that is not designed for the particular bay. Often, the device carriers are sized to fit snugly within a bay to support the device when it is installed. This maintains the integrity of the connection between the peripheral device and the computer system data bus so that data communication is not interrupted, thus leading to a more reliable computer system. Further, if the device carrier is not the correct size or type, strain may be placed on the connectors, leading to damaged connections and loss of system reliability. Computer systems including personal computers, workstations, servers, and embedded systems typically include a motherboard on which most of the fixed internal processing circuitry of the computer is mounted. While working memory (such as random access memory or RAM) may be mounted on the motherboard, permanent memory devices typically are not. Many computer systems are designed to have multiple peripheral devices, including memory devices, included in the system. A typical personal computer system includes a processor with associated memory, control logic, and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives and/or digital video/versatile disk (DVD) drives. Additionally, computer systems often have the capability to interface with external enclosures that include additional peripheral devices. One or more data busses are coupled to connectors that mate with connectors on the peripheral devices to enable electrical communication between the peripheral devices and the rest of the computer system. Several computer systems are often connected to a central network server including one or more mass storage devices. Multiple disk drives can be configured to co-operate advantageously using technology generally known as redundant array of independent disks (RAID). RAID systems are particularly useful in the network servers because they provide data redundancy, such that if a single disk drive fails, the data stored thereon can be reconstructed from the data stored on the remaining disks. In the most sophisticated network servers and RAID systems, a failed disk drive can be replaced and the data thereon restored by software without interrupting the server's operation. In so-called "hot plugging," the failed disk drive is removed and a new one installed in its place without cutting off the power to the drive or server, and without rebooting the server. Similarly, if storage space becomes limited, disk drives can be added or upgraded without interrupting system operation. A disk drive with this capability is often referred to as "hot-plugable." One of the problems with the use of removable disk drives arises when a user attempts to install a carrier including a hard drive or other peripheral device in a slot wherein the internal connector in a peripheral device bay is not compatible with the connector on the peripheral device. If the peripheral device connector does not mate properly with the internal connectors in the bay, the user may jam the carrier more forcefully in the bay, which could result in damage to the connector assemblies or to the device carrier. It is therefore desirable to provide carrier and bay structures that will prevent a user from damaging a peripheral device and/or connectors in the bay when attempting to install a device having an incompatible connector.

Another problem arises when a user attempts to utilize a peripheral device carrier that is not designed for the particular bay. Often, the device carriers are sized to fit snugly within a bay to support the device when it is installed. This maintains the integrity of the connection between the peripheral device and the computer system data bus so that data communication is not interrupted, thus leading to a more reliable computer system. Further, if the device carrier is not the correct size or type, strain may be placed on the connectors, leading to damaged connections and loss of system reliability.

The inventor hereby incorporates the above referenced patents into this specification.

SUMMARY OF THE INVENTION

The present invention relates to a modular data storage device assembly. The modular data storage device assembly includes a chassis that has an open front and a back and has exterior dimensions that correspond to the dimensions of an industry standard drive bay.

In a first aspect of the present invention the chassis includes a plurality of slots that are disposed inside the chassis.

In a second aspect of the present invention the modular data storage device assembly also includes a plurality of disk data storage devices. Each disk data storage device is disposed in one of the plurality of slots.

In a third aspect of the present invention the modular data storage device assembly further includes a backplane. The backplane is disposed in the chassis and has a plurality of disk drive interface connectors that are mechanically coupled thereto. Each disk drive interface connector is connected to one of the disk data storage devices. The chassis design and the backplane design provide for blind mating and pluggability of the disk data storage devices into the backplane.

In a fourth aspect of the present invention the modular data storage device assembly includes a power source connector. The power source connector is mechanically coupled to the backplane and electrically coupled to the data storage device connectors.

In a fifth aspect of the present invention the modular data storage device assembly includes a blower as a means of enhancing storage device cooling.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE DRAWINGS

FIG. 9 is a perspective drawing of a modular data storage device assembly having a plurality of disk data storage devices and a backplane according to the first embodiment of present invention.

FIG. 10 is a perspective drawing of a disk data storage device for use in the modular data storage device assembly of FIG. 9.

DESCRIPTION OF THE PREFERRED EMBODIMENT

U.S. Pat. No. 5,822,184 a modular data device assembly for a computer. In the description, specific materials and configurations are set forth in order to provide a more complete understanding of the present invention. But it is understood by those skilled in the art that the modular data device assembly can be practiced without those specific details. In some instances, well-known elements are not described precisely so as not to obscure the modular data device assembly.

Figure 1:
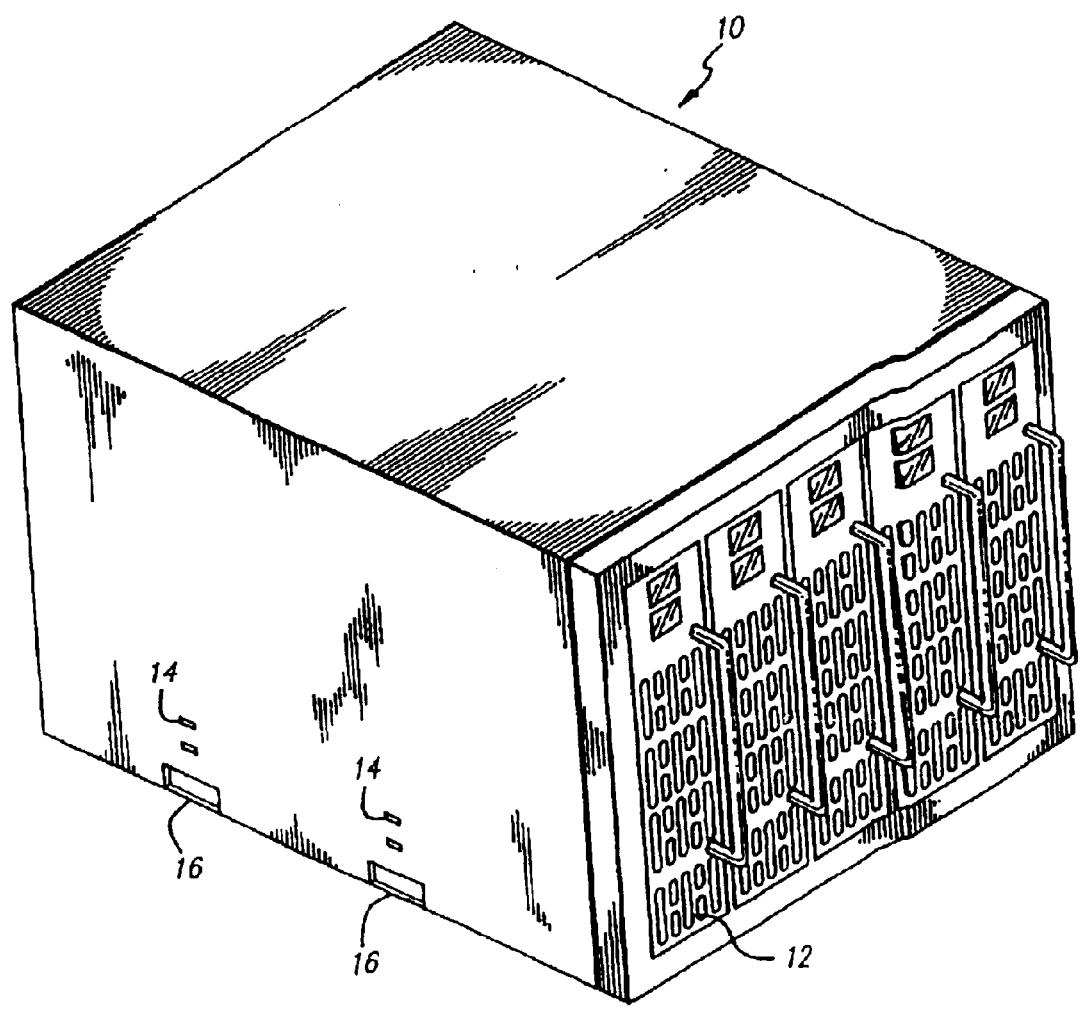
FIG. 1 is a perspective view of a modular data device assembly of the prior art.
Figure 2:
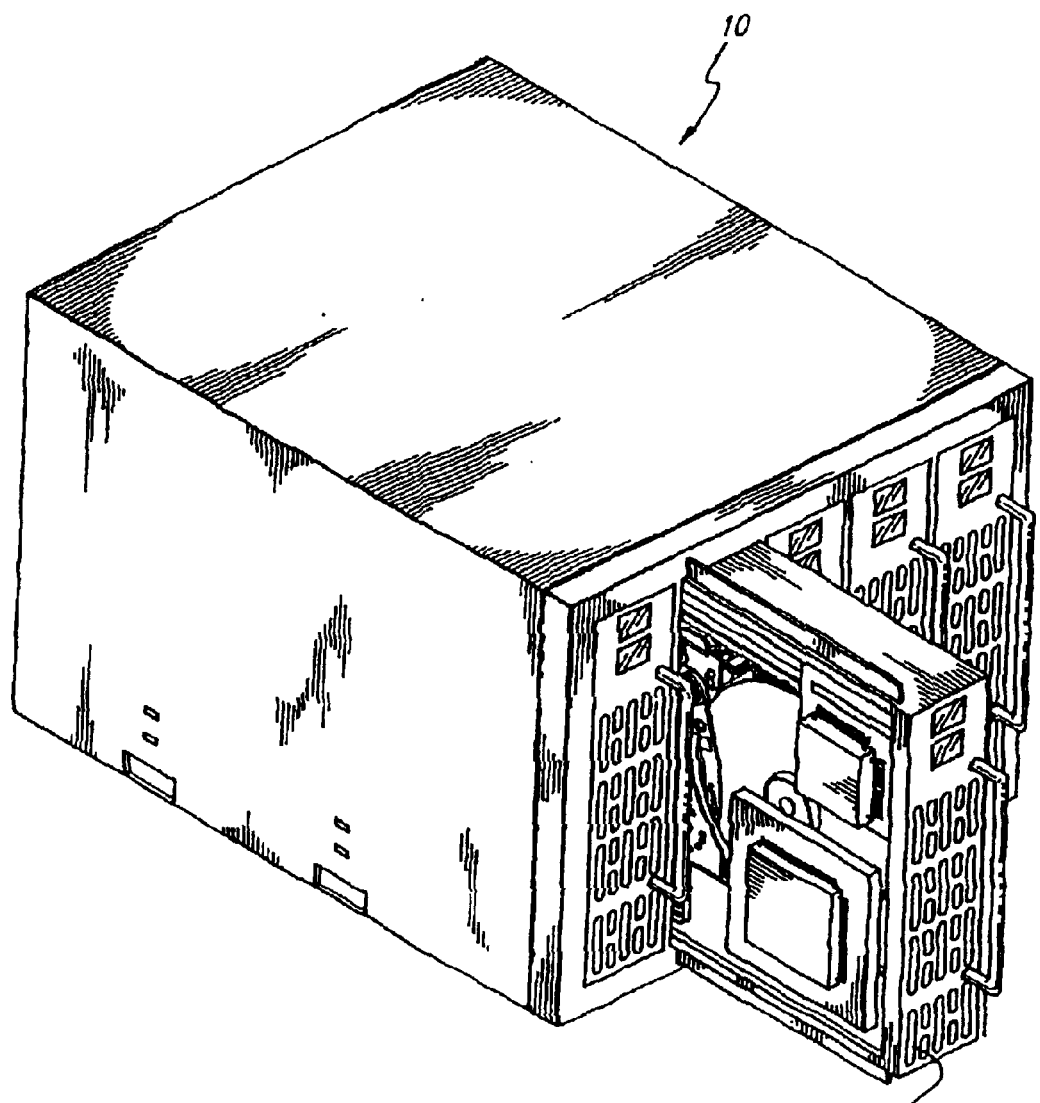
FIG. 2 is a perspective view of the modular data device assembly of FIG. 1 wherein one disk drive has been partially removed from the housing to expose the electronics.

Referring to FIG. 1 in conjunction with FIG. 2 the modular data device assembly includes a housing 10 holding a plurality of modular data devices disposed in the housing 10. A motherboard is disposed in the back of the housing 10 and a bus interconnects the data devices 12 that operate under the direction of a controller. Although the following describes the modular data device assembly relative to a laptop, desktop or like personal computer, it is clear that it is easily adaptable to a computer of any size or capacity. The modular data device assembly includes a housing 10 having a predetermined height, width, and depth. In the front of the housing 10 are modular data device assemblies, in this case, hard disk drives 12. It can be adapted for use with other modular data device assemblies such as CD-ROM drives, tape drives, floppy drives, RAM cards, PCMCIA cards, and related data devices. The disk drives 12 are mounted vertically and slide into the housing 10 through the front. The modular data device assembly can be adapted for mounting inside a computer expansion bay and can also be used external to the computer housing.

Figure 3:
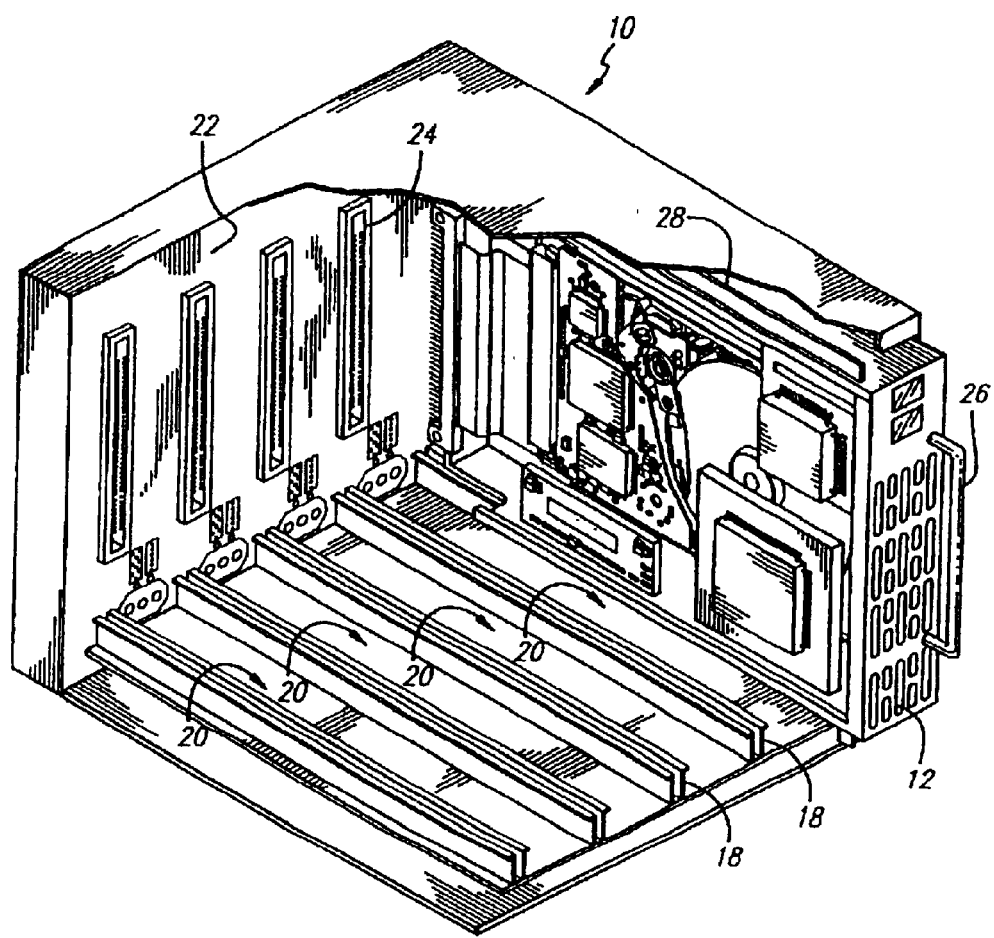
FIG. 3 is a cut away view showing the disk drive mounting hardware within the modular data device assembly of FIG. 1 showing plug-in connectors of a backplane.
Figure 4:
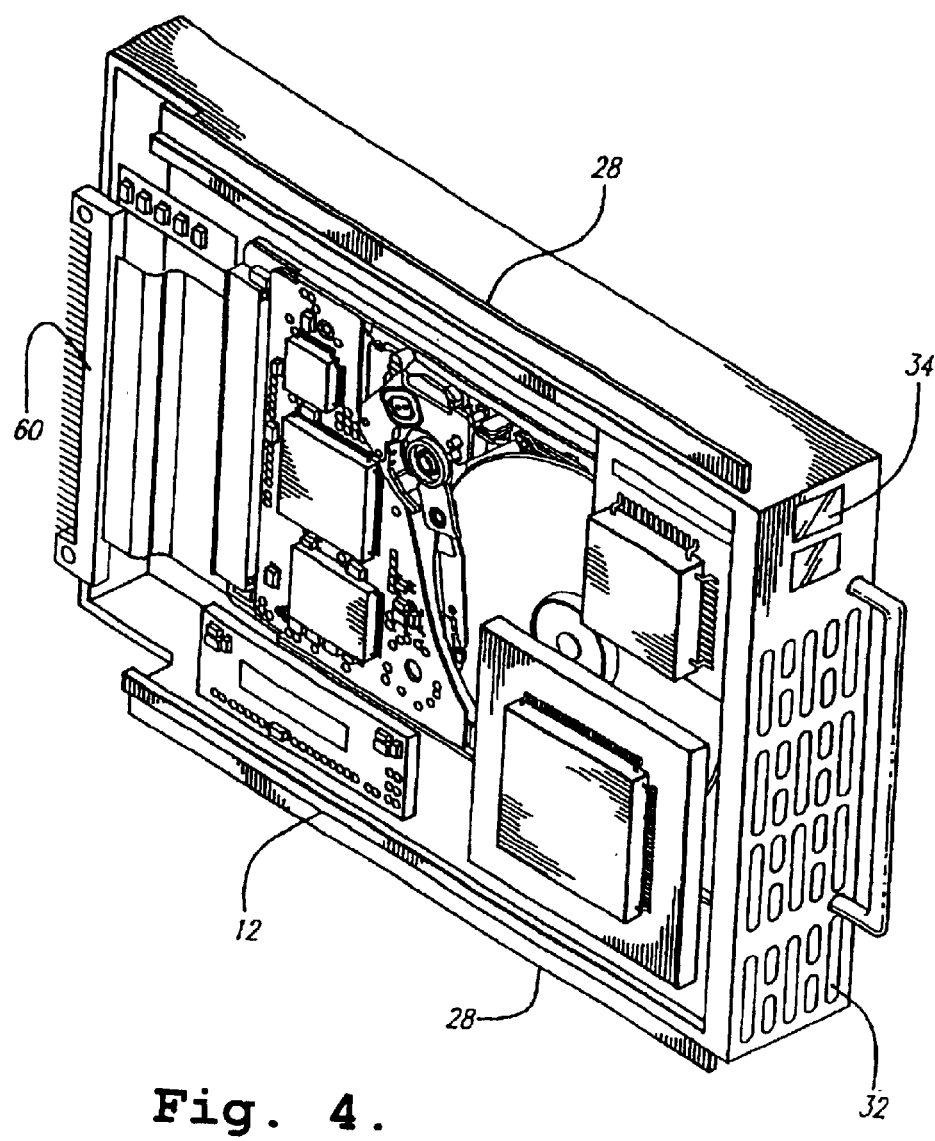
FIG. 4 is a perspective view of an exemplary embodiment disk drive with a back having a connector for mounting to the backplane.
Figure 5:
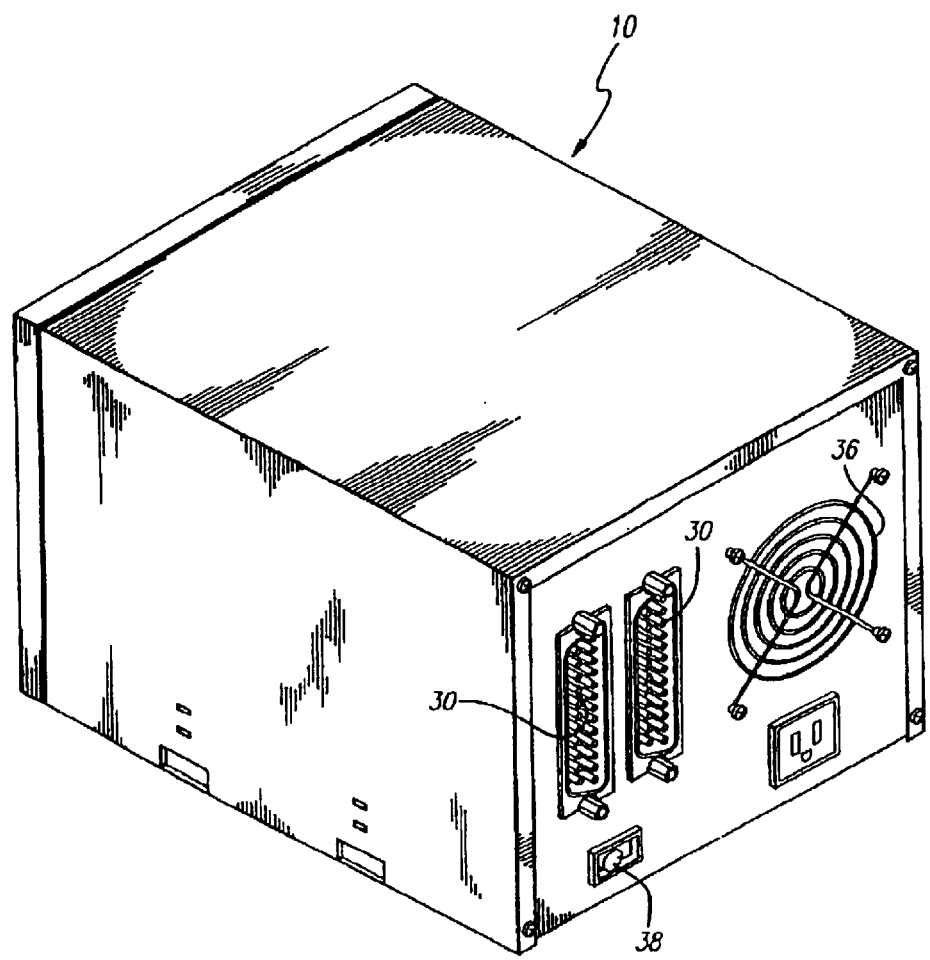
FIG. 5 is a perspective view of the backside of the modular data device assembly of FIG. 1 showing a cooling fan, I/O ports, a power socket and a power switch.

Referring to FIG. 3 in conjunction with FIG. 4 and FIG. 5 the modular data device assembly is a modular, self-contained unit so that it can be operated external to the computer. To this end, the disk drive controller, as is known in the art, can be mounted inside the computer enclosure or outside, perhaps inside the present invention assembly. The disk drive 12 can be of any given configuration. Such disk drives 12 are readily available in the commercial market and well known in the art. The standard disk drive 12 includes flanges 28 for mounting in the housing 10. The back of the standard disk drive can have drive-ready connectors. Optionally, the disk drive 12 if not drive-ready can be converted with an 80-pin high-density drive ready connector (hot plug type) 60 to make the drive 12 RAID ready. Other types of connectors can be used depending upon design requirements. The outer dimensions such as the length, width, and depth of the housing 10 are designed to fit within the confines of a single, industry standard size expansion slot or bay of a personal computer. The modular data device assembly preferably contains five hard disk drives 12 of possibly 3.5-inch or 2.5-inch size drives that can be inserted into a conventional 5.25-inch form factor full height disk drive bay, or a 5.25-inch full height plus 5.25-inch half height disk drive bay. Needless to say, the present invention modular data device assembly is easily adapted to disk drive bays of other sizes, whereby the assembly is made larger or smaller by varying the size and number of each modular data device within the assembly. The conventional outer dimensions of the housing 10 allows the modular data device assembly to be easily adapted for use in many types of computers. Optional mounting slots 16 and screw holes 1 are provided on the sides of the housing 10 for conventional installation within a disk drive bay. The housing 10, of course, may be installed in an expansion bay not necessarily dedicated to a disk drive. The disk drives 12 slide along rails 18 within a slot 20. At the back of the housing 10 is a backplane 22. On the interior of the motherboard 22 are industry standard plug-in connectors 24 corresponding to the disk drives 12. The plug-in connectors 24 further enhance the modular characteristic of the present invention by permitting the individual disk drives 12 to be installed or removed without tools, wherein the electrical connections are completed or broken by pushing or pulling on the disk drive 12. Indeed, for this purpose, each disk drive 12 preferably includes a handle 26. Each disk drive 12 preferably includes outward extending flanges 28 on either side that slide along the rails 18, thereby aligning the electrical connector plugs at the back of the disk drive 12 with the complementary connectors 24 on the motherboard 22. Indeed, the disk drive 12 may utilize an edge card connector on the back for engagement with the connectors 24. Alternatively, if the data device is disposed on a printed circuit board, the PCB slides along the rail into engagement with the connector. A bus interconnects all of the individual disk drives 12 or data devices preferably leading to a SCSI in/out port at the back of the housing 10. Two such ports 30 are in back of housing 10. The disk drives 12 can be of any configuration known in the art. Cooling vents 32 are disposed in the front. Optional light emitting diodes 34 indicate operation of the disk drive 12. There is an optional cooling fan 36 that draws air through the front cooling vents 32 of the disk drives 12. A thermistor, a rheostat, or similar device known in the art controls the cooling fan 36 by interior temperatures within the housing though. There is an optional on/off switch 38 as well as a grounded socket 40 through which power is fed to the disk drives.

Figure 6A:
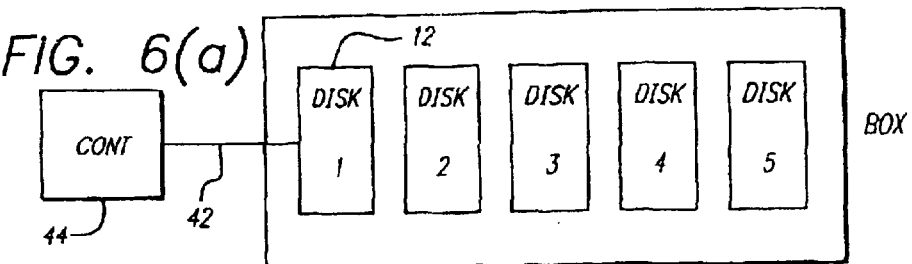
FIGS. 6(*a*)–(*c*) are block diagrams representing various arrangements of the modular device assembly of FIG. 1.
Figure 6B:
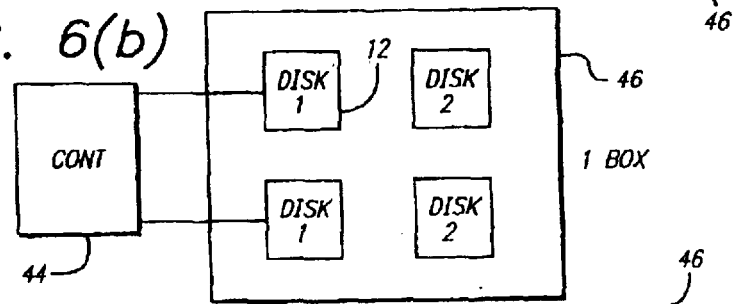
Figure 6C:
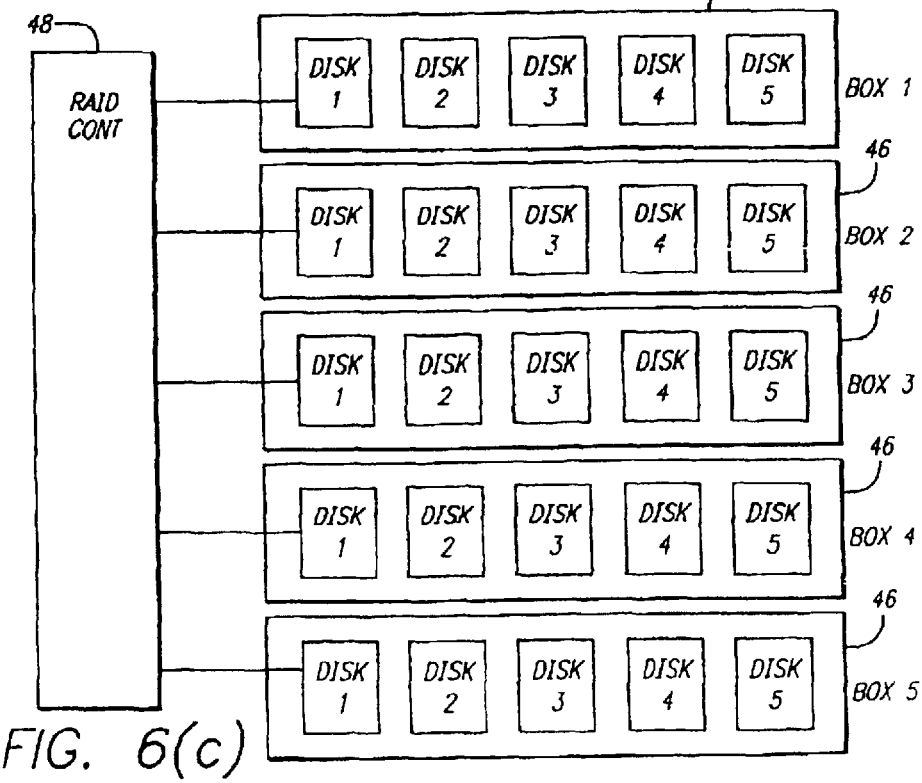

Referring to FIGS. 6(a), 6(b) and 6(c) show a variety of configurations for the disk drives. FIG. 6(a) provides a block diagram illustrating the network of the disk drives 12 within the housing 10 via bus 42 to a SMART, SCSI, or IDE controller preferably located in the computer. In most modern computers, such a controller 44 automatically determines the number of drives and the protocol necessary to access each drive. As seen in FIG. 6(a), the disk drives are interconnected in series. As seen in FIG. 6(b), the disk drives are connected and parallel. As seen in FIG. 6(c), the disk drives are connected in series wherein each assembly 46 is joined with other assemblies to form an array and controlled by a RAID controller 48. Although the assemblies 46 in FIG. 6(c) show the disk drives connected in series, naturally, they can also be connected in parallel as seen in FIG. 6(b). The assemblies 46 therefore form tiers of redundant storage. Accordingly, the modular nature of the components permits easy and convenient maintenance and replacement of damaged or defective disk data storage devices. Their arrangement in an array takes advantage of RAID concepts to avoid irretrievable data loss.

Figure 7:
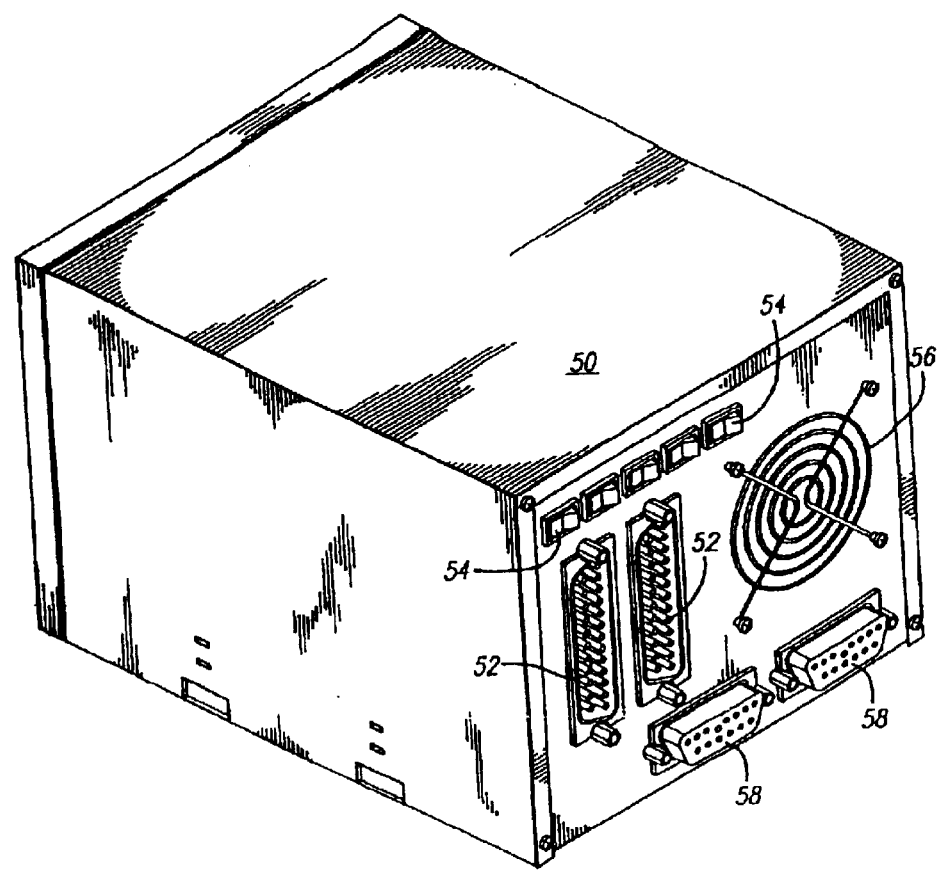
FIG. 7 is a perspective view of the backside of an alternative embodiment of the modular data device assembly of FIG. 1.
Figure 8:
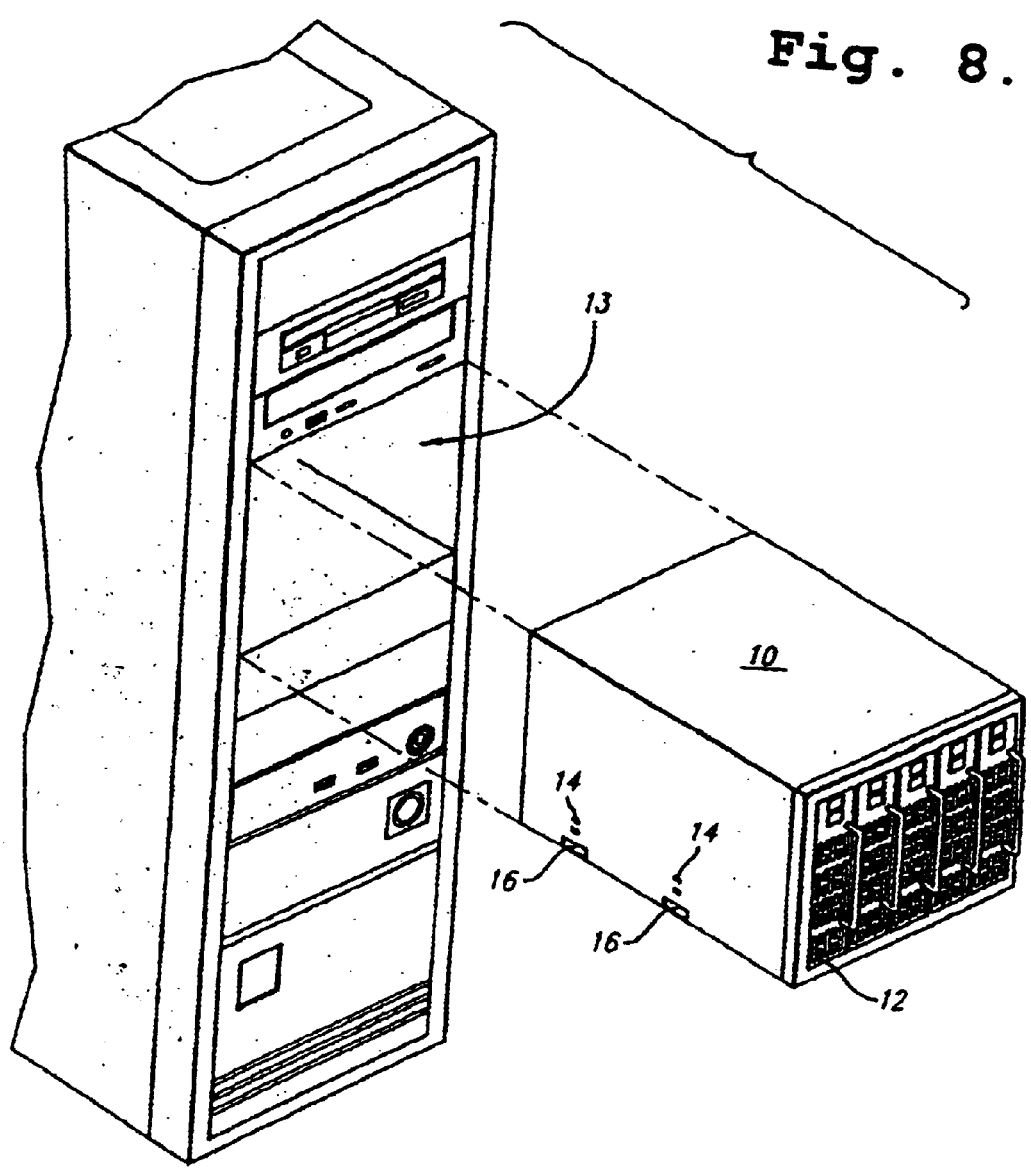
FIG. 8 is a perspective view showing the modular data device assembly of FIG. 7 being inserted into an operative position in an expansion bay of a personal desktop computer.

Referring to FIG. 7 in conjunction with FIG. 8 an alternative housing 50 has two ports 52, five disk drive ID switches 54, a cooling fan 56, and two DC power connectors (disk drive type) 58.

Referring to FIG. 9 in conjunction with FIG. 10a computer 110 includes a modular data device assembly 120. The modular device assembly 120 has housing 121, six hard disk drives 122 and six removable sleds 123. Each of the six hard disk drives 122 is mounted to one of the six removable sleds 123. The housing 121 is designed to fit into conventional industry standard slot of 1.675 inches by 5.75 inches. Individual plug in data storage devices, such as hard disk drive tape drive or CD-ROM or any standard device, may be disposed horizontally in a stacked formation within the housing 121. A motherboard with plug in connector to which the hard disk drives 122 are connected allows easy replacement of defective data devices. These hard disk devices 122 slid in and out (hot swap). The hard disk drives 122 and modular data device assemblies may be arrayed in serial or parallel or individually to a controller. By its modular structure and redundant storage functions the modular device assembly 120 benefits from what is known as Redundant Array of Independent Disks principle. The housing is of all metal construction thereby creating an interlocking and shielding assembly. The interlocking assembly provides excellent electromagnetic shielding without the use of assembly hardware. The housing 121 fits precisely into the 5.25" industry standard slot form factor. A 5.25" storage expansion slot is defined as having a width of 5.85" (145.6 mm) and a height of 1.675" (42.55 mm) with a typical depth of 9.00" (228.6 mm).

Referring again to FIG. 9 in conjunction with FIG. 10 a modular data device assembly 110 includes a chassis 111 that has an open front and a back. The chassis 111 also has exterior dimensions that correspond to the dimensions of an industry standard drive bay which are approximately 5.75 inches by 1.675 inches. The chassis 111 further has a plurality of slots 112 that are disposed inside the chassis 111.

Figure 11:
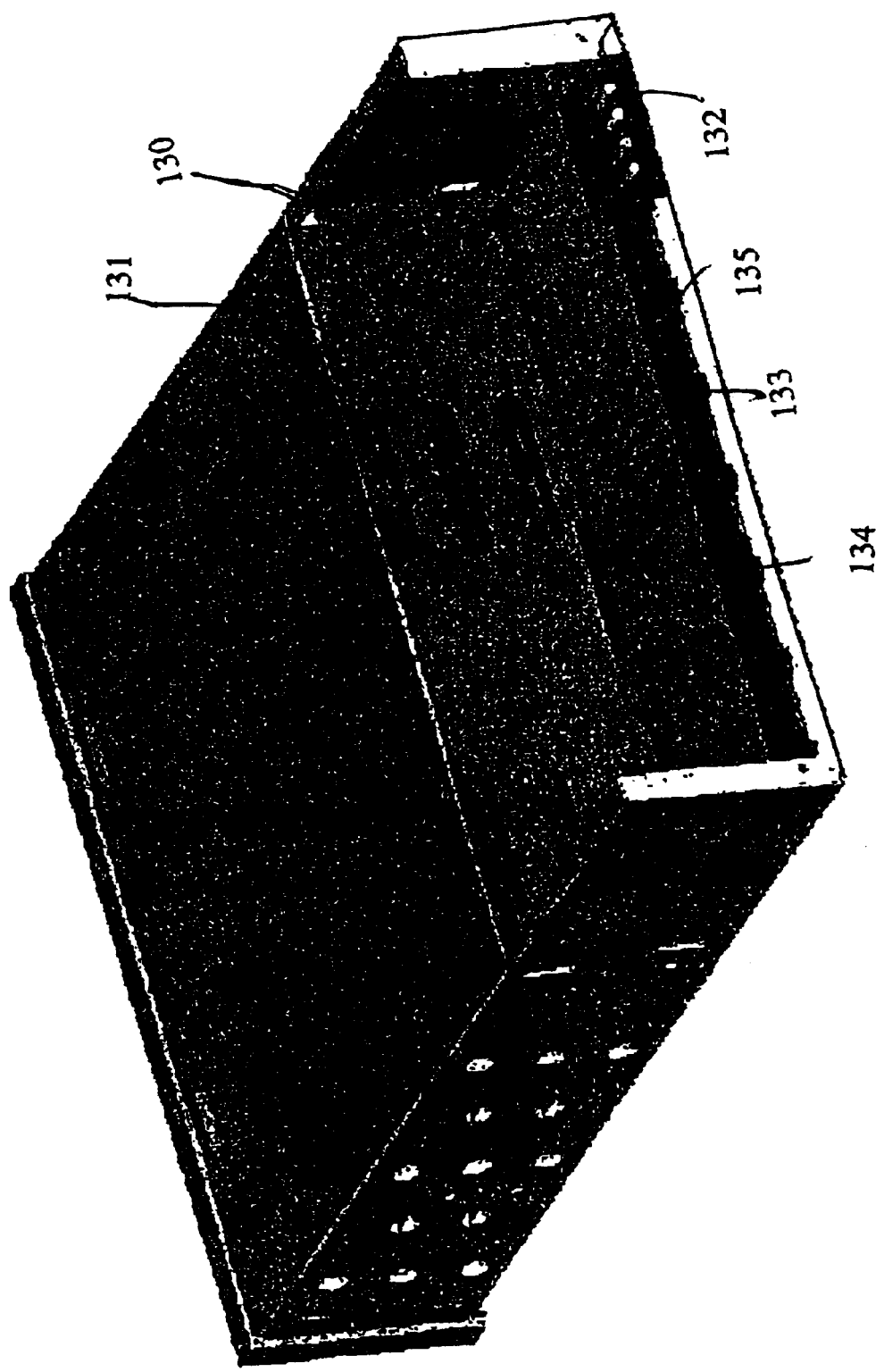
FIG. 11 is perspective drawing of the backplane of the modular data storage device assembly of FIG. 9.

Referring to FIG. 10 in conjunction with FIG. 11 the modular data device assembly 110 also includes a plurality of disk data storage devices 120 each of which is disposed in one of plurality of removable disk sleds or trays 121 with a locking mechanism 122, a backplane 130 that has a plurality of cable connectors 131 and a power source connector 132 and a personality card 133 that has a host connection 134 and RAID controller 135. Each removable disk sled or tray 121 for the disk data storage device 120 is disposed in one of the plurality of slots 112. The backplane 130 is disposed in the back of the chassis 111. The cable connectors 131 are mechanically coupled thereto. Each connector is connected to one of the disk data storage devices 120 that may be a SATA hard disk drive. The power source connector 132 is mechanically and electrically coupled to the backplane 130. The possible host connections are fiber channel, SCSI, iSCSI, NAS, USB, IEEE, 1394 and parallel.

Referring to FIG. 11 in conjunction with FIG. 9 the user interface is the connection to the host computing and is determined by the personality board 133. The user interface can be SCSI, IDE (also called ATA), FC-AL, IEEE 1394 (also called Firewire), USB (Universal Serial Bus), Local Area Network (LAN, e.g., 10/10 Mbps standard ethernet and 1 GB/sec fast ethernet. The RAID controller is electrically coupled to five disk data storage devices 122 which are SATA. The interface may be electrically coupled to any one of the following optional outputs: IDE, SCSI, 1394, USB, Fiber or Network ATT. U.S. Pat. No. 5,974,490 teaches a backplane that is formed with an interconnection pattern containing high-speed control buses such as SCSI buses and which is disposed at the central portion of a housing 121. The disk data storage devices 122 are capable of being removably inserted by plugging are directly mounted on the front side of the backplane through bus connectors. There are connectors for external connection and connectors of the control buses terminal units having terminal circuits of the control buses, power units for supplying power to the disk units.

Figure 12:
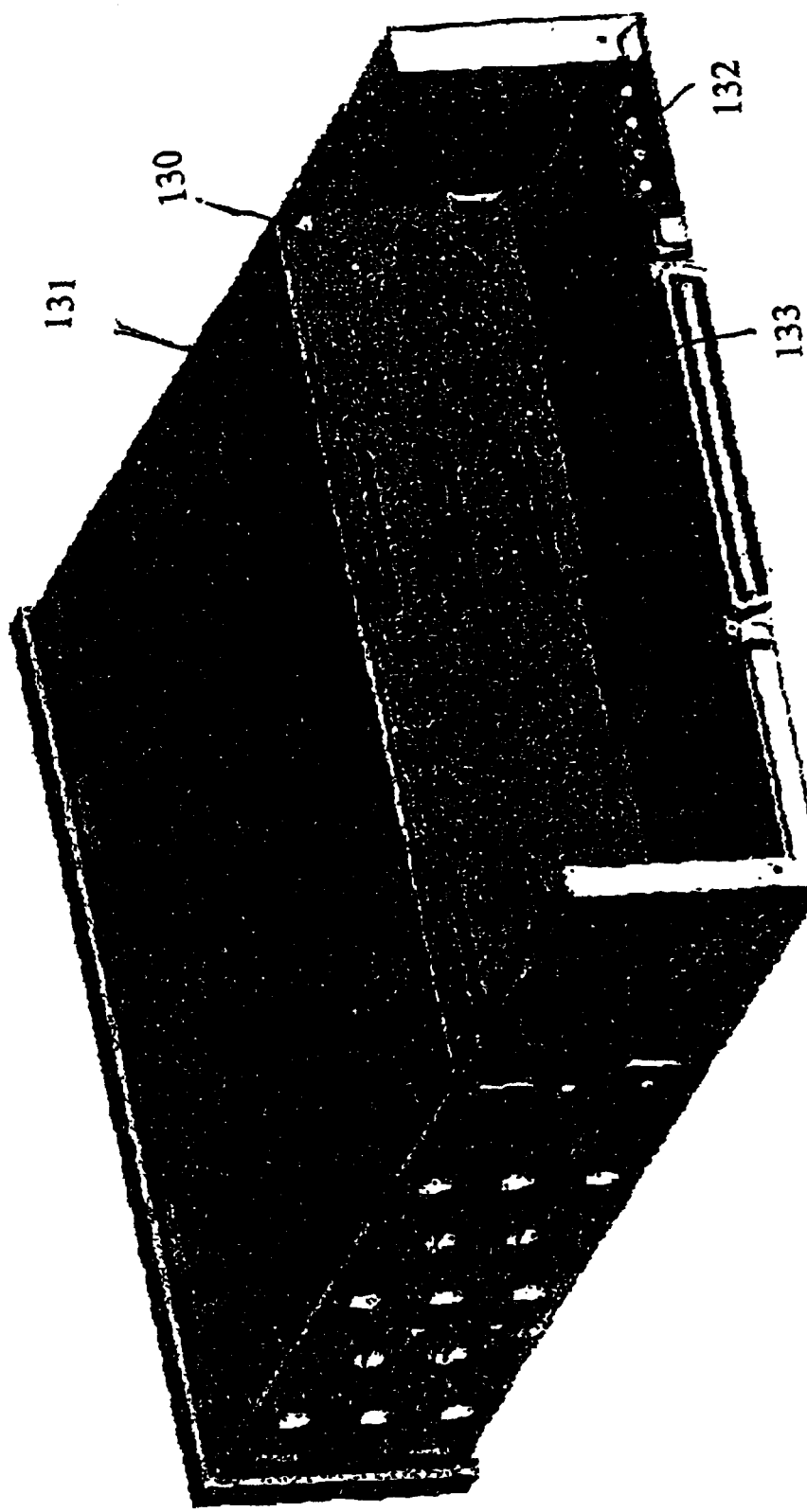
FIG. 12 is perspective drawing of an alternative backplane of the modular data storage device assembly of FIG. 9.

Referring to FIG. 10 in conjunction with FIG. 12 the modular data device assembly 110 also includes a plurality of disk data storage devices 120 each of which is disposed in one of plurality of removable disk trays 121 with a locking mechanism 122, a backplane 130 that has a cable connectors 151 and a power source connector 132. Each removable disk sled or tray 121 for the disk data storage device 120 is disposed in one of the plurality of slots 112. The backplane 130 is disposed in the back of the chassis 111. The cable connectors 151 are mechanically coupled thereto. Each connector is connected to one of the disk data storage devices 120 that may be a Serial-ATA hard disk drive. The power source connector 132 is mechanically and electrically coupled to the backplane 130. The possible host connections are fibre channel, SCSI, iSCSI, NAS, USB, IEEE, 1394 and parallel.

Figure 13:
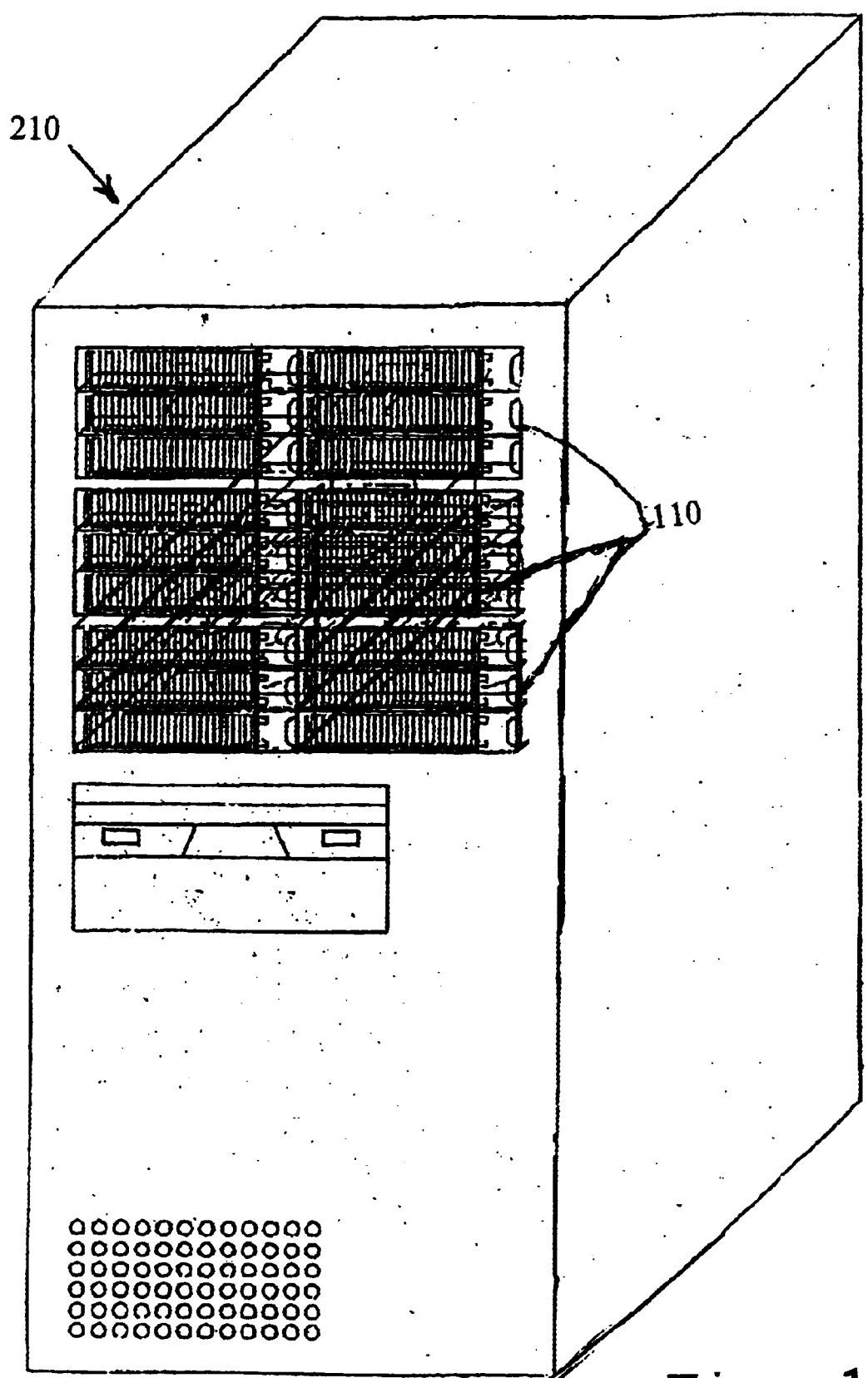
FIG. 13 is a perspective drawing of a computer tower that uses multiples of the modular data storage device assembly of FIG. 9.
Figure 14:
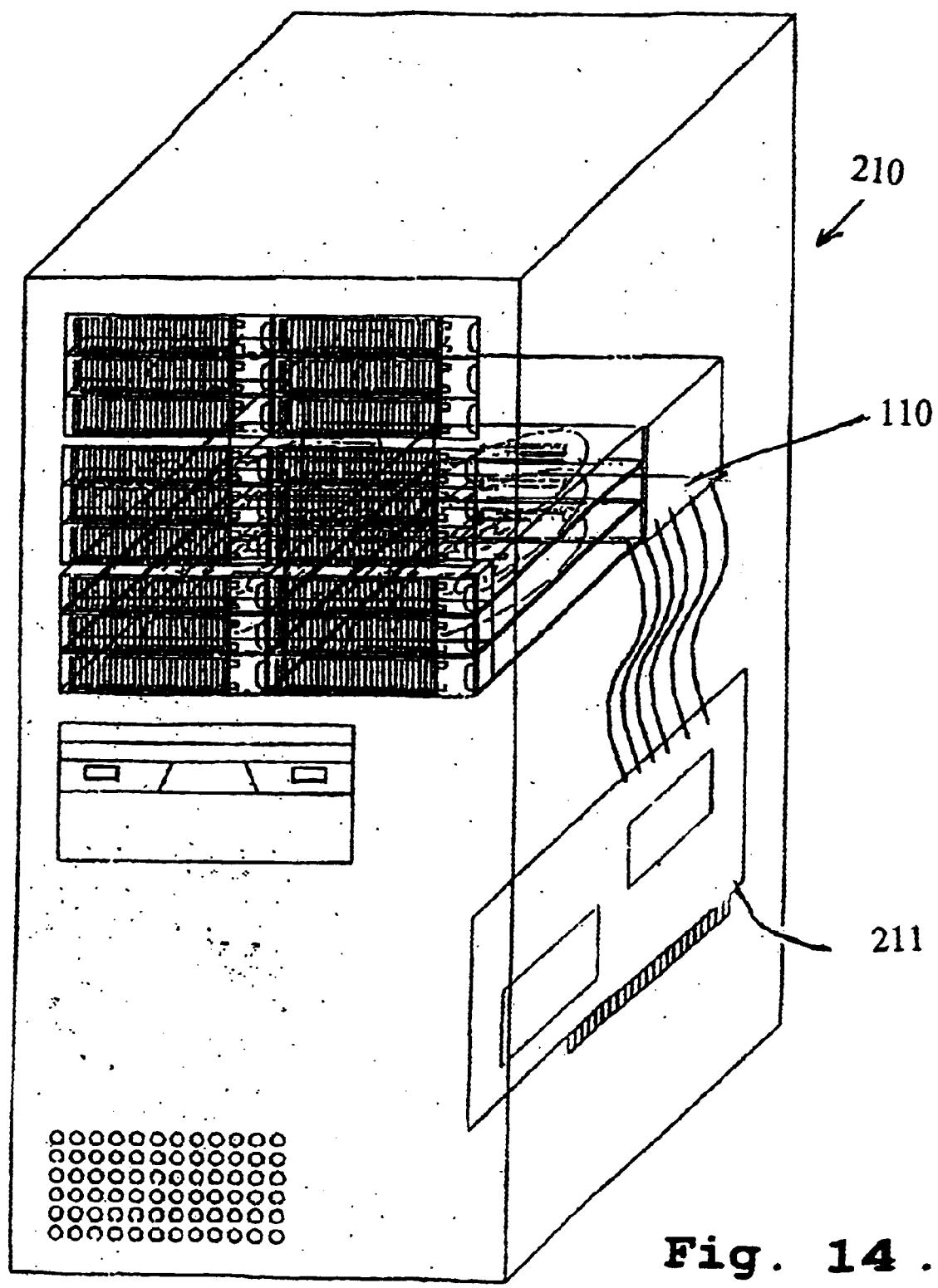
FIG. 14 is a perspective drawing of the computer tower of FIG. 13 that shows a controller and multiples of the modular data storage device assembly of FIG. 9.

Referring to FIG. 9 in conjunction with FIG. 13 and FIG. 14 the modular data device assembly 110 may be placed in a tower computer 210. The tower computer 210 includes either an internal RAID controller 211 or an internal JBOD controller.

Figures 15, 16:
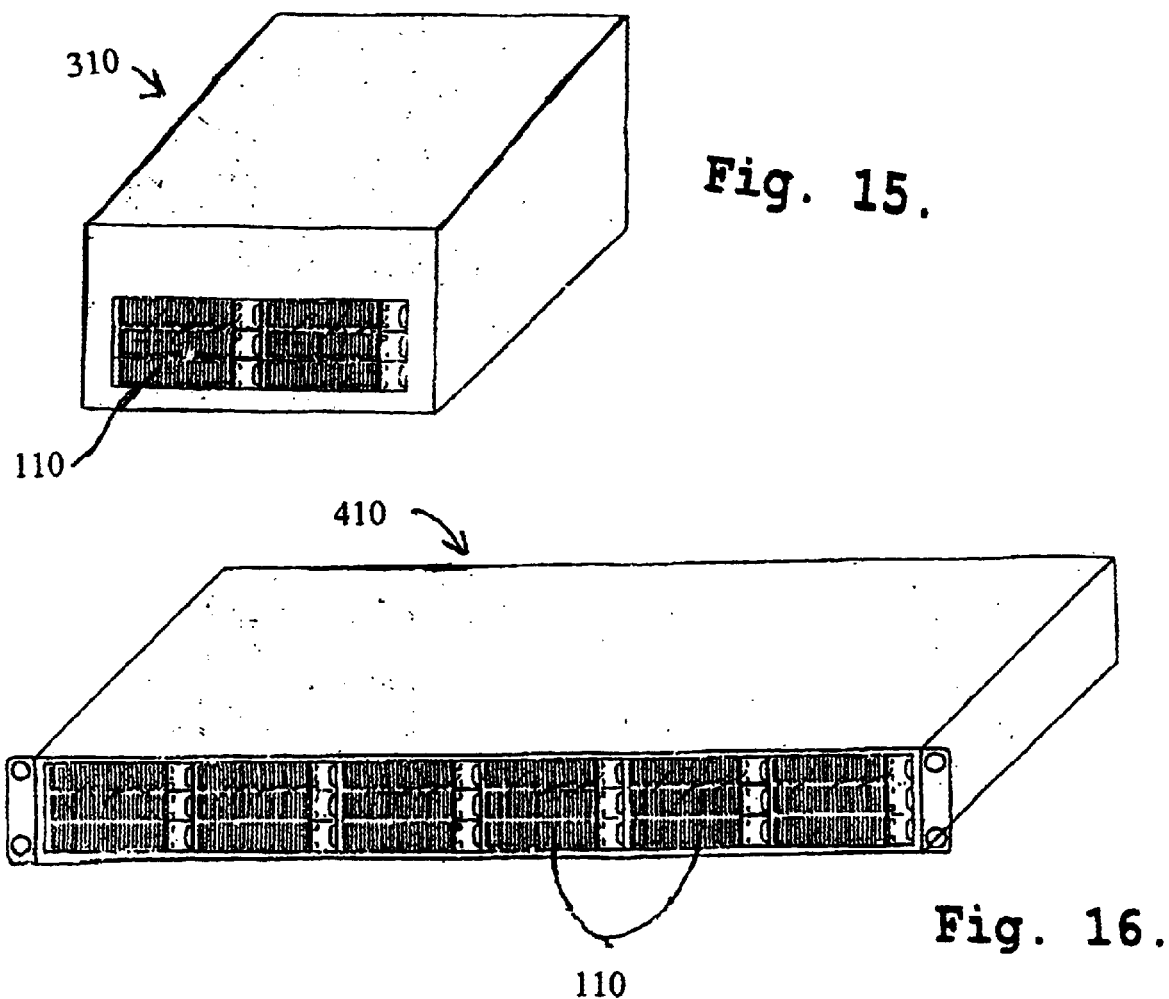
FIG. 15 is a perspective drawing of an external box that uses the modular data storage device assembly of FIG. 9.
FIG. 16 is a perspective drawing of a one-rack unit mountable storage system that uses three modular data storage device assemblies of FIG. 9.

Referring to FIG. 9 in conjunction with FIG. 15 the modular data device assembly 110 may be placed in an external box 310.

Referring to FIG. 9 in conjunction with FIG. 16 a one-unit rack-mount computer enclosure 410 includes three modular data device assemblies 110.

Figure 17:
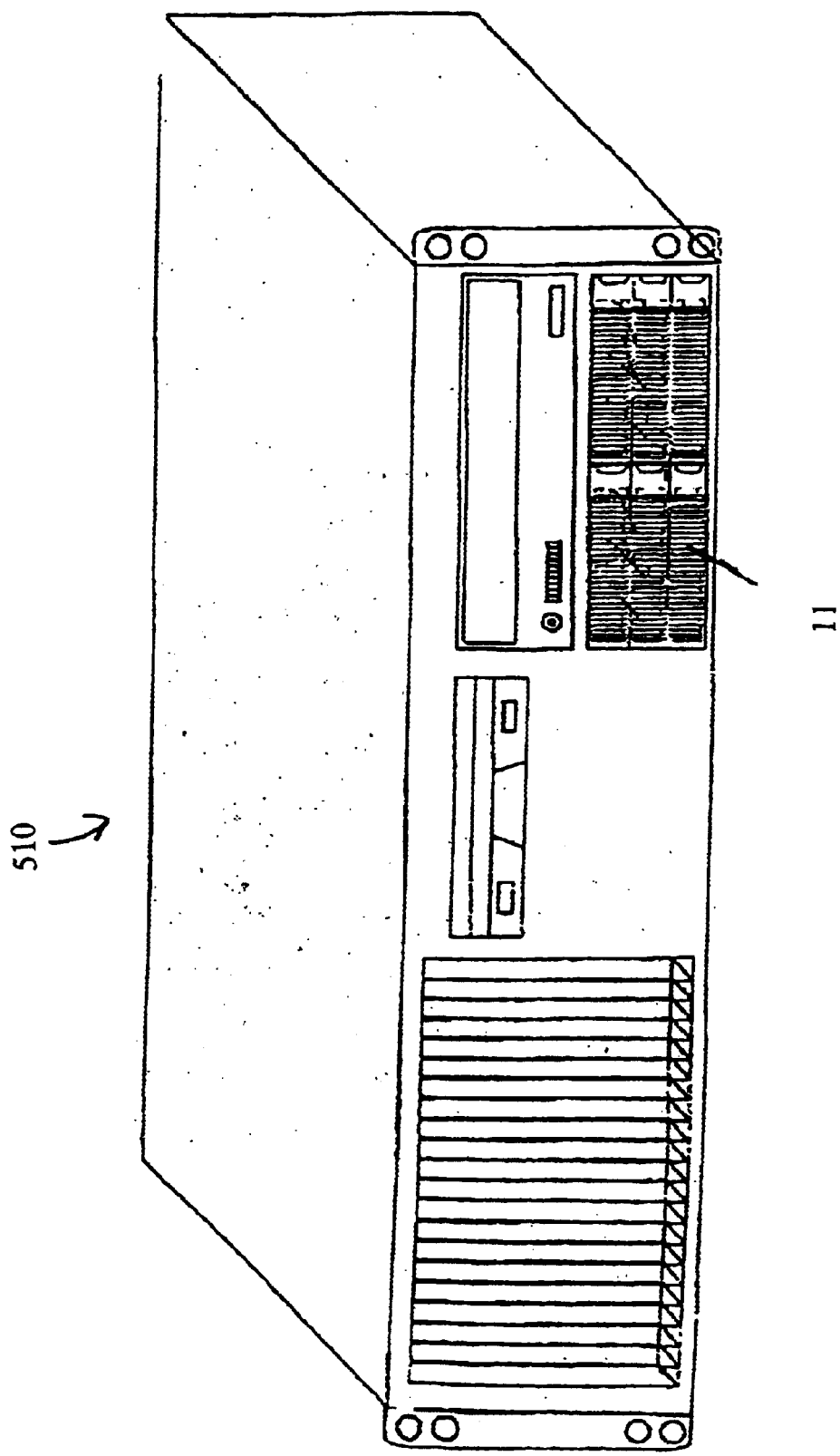
FIG. 17 is a perspective drawing of a rack-mount with a 5.25 inch-drive by that uses the modular data device assembly of FIG. 9.

Referring to FIG. 9 in conjunction with FIG. 17 a rack-mount 510 with a 5.25 inch-drive by uses the modular data device assembly 110.

Figure 18:
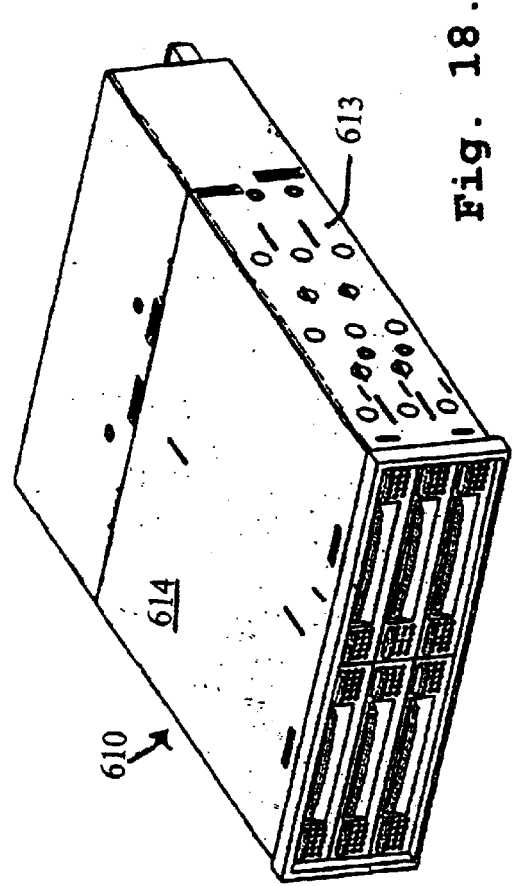
FIG. 18 is a front perspective drawing of a modular data storage device assembly having a plurality of Serial ATA disk data storage devices, a chassis and a chassis-cover according to the second embodiment of the present invention.
Figure 19:
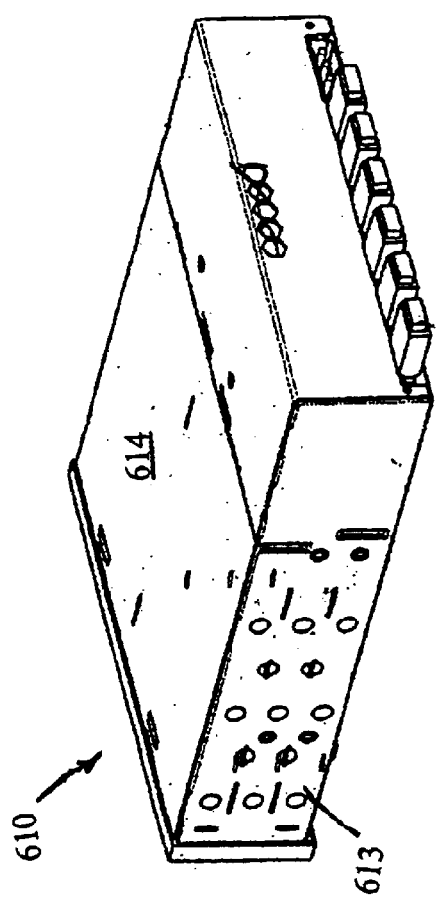
FIG. 19 is a rear perspective drawing of the modular data storage device assembly of FIG. 19.
Figure 20:
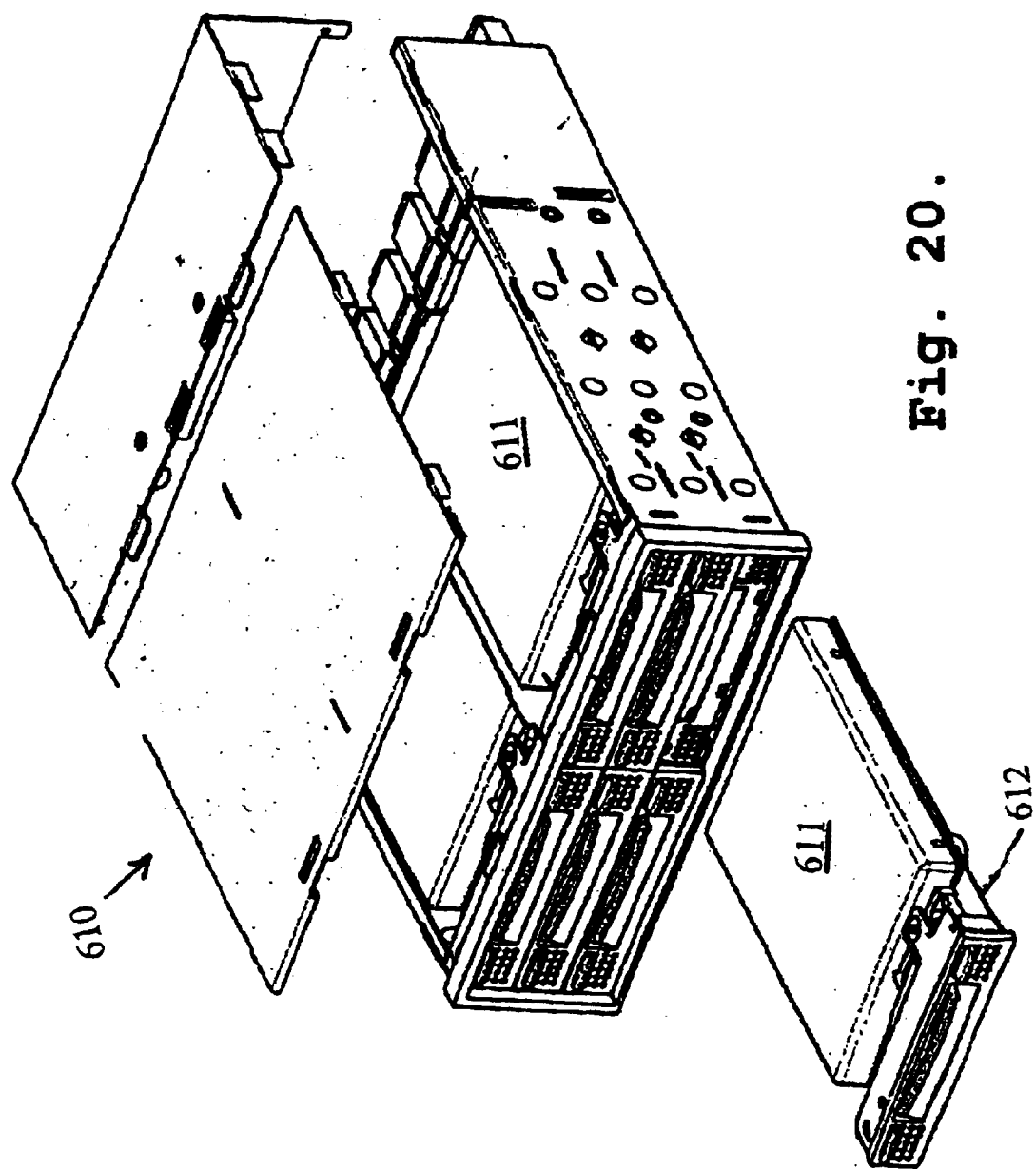
FIG. 20 is an exploded front perspective drawing of the modular data storage device assembly of FIG. 18 exposing a Serial ATA disk data storage device, a sled or tray and a backplane.

Referring to FIG. 18 in conjunction with FIG. 19 and FIG. 20 a modular data storage device assembly 610 includes six Serial ATA disk data storage devices 611, six sleds or trays 612, a chassis 613 and a chassis-cover 614 of a Serial ATA disk data storage device, a tray and a backplane.

Figure 21:
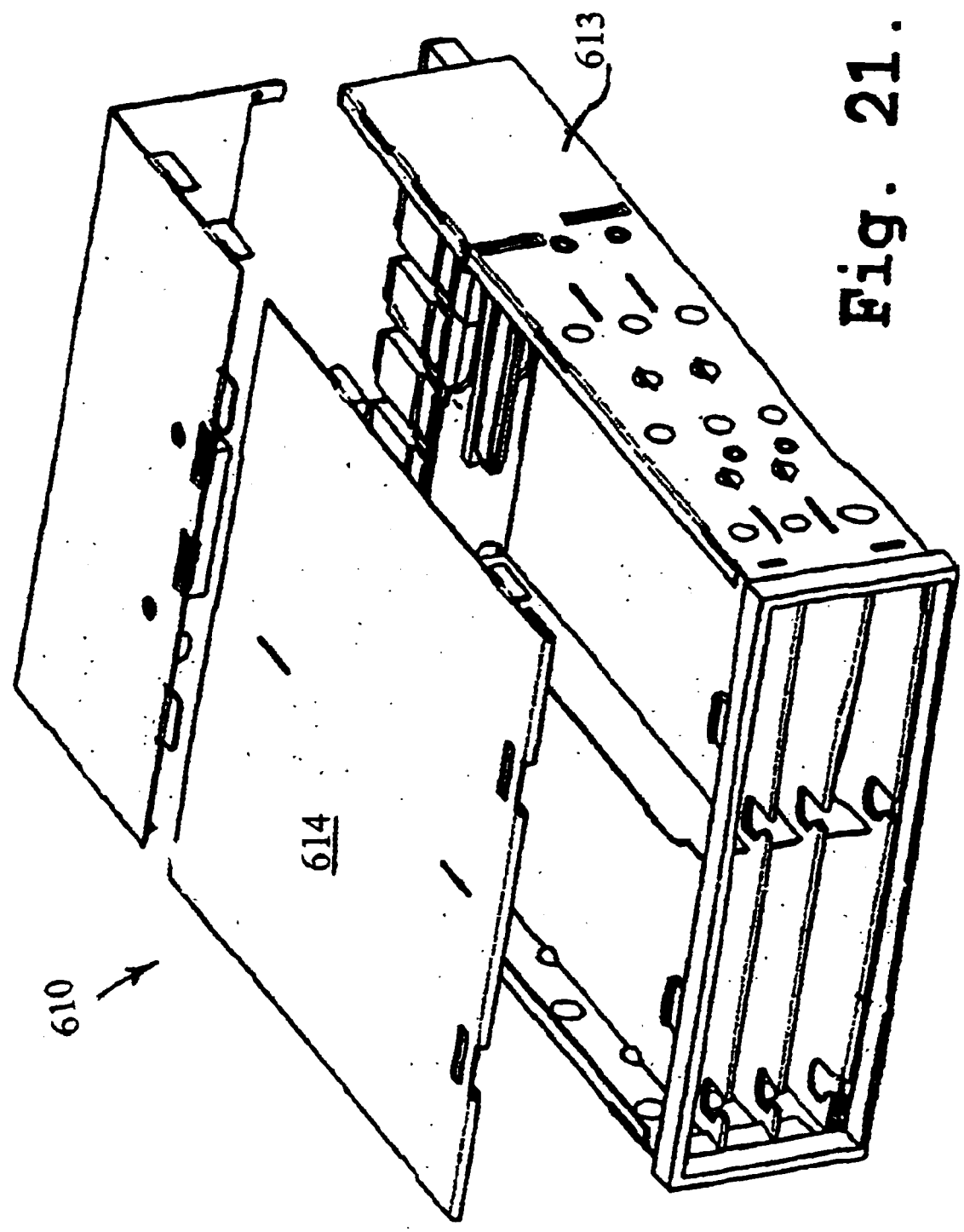
FIG. 21 is a front perspective drawing of the chassis that has slots for the plurality of Serial ATA disk data storage devices and the chassis-cover of the modular data storage device assembly of FIG. 18.
Figure 22:
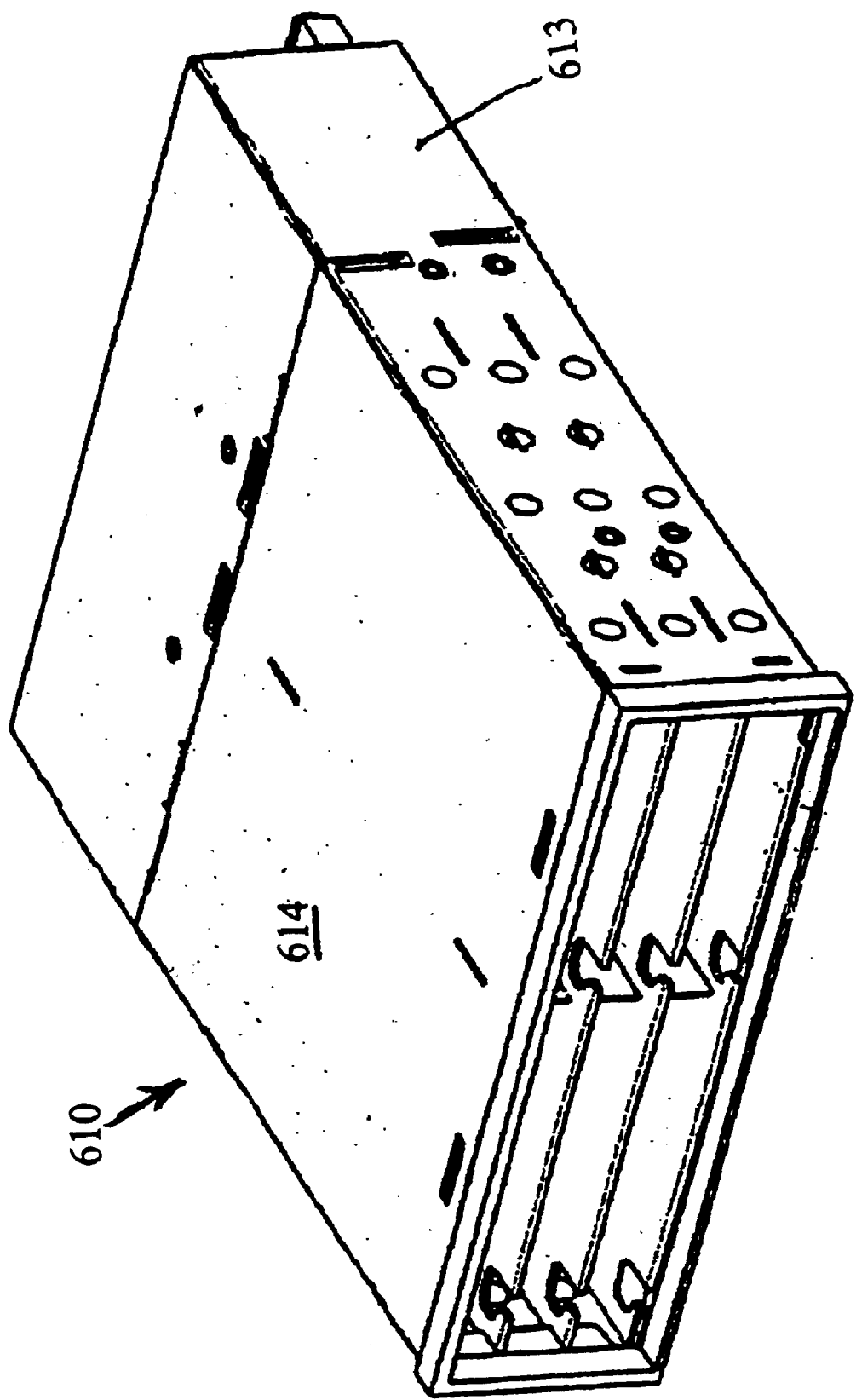
FIG. 22 is a front perspective drawing of the chassis that has slots for the plurality of Serial ATA disk data storage devices of the modular data storage device assembly of FIG. 18.

Referring to FIG. 21 in conjunction with FIG. 18 and FIG. 22 the chassis 613 of the modular data storage device assembly 610 has six slots for the six Serial ATA disk data storage devices of the modular data storage device assembly 610.

Figure 23:
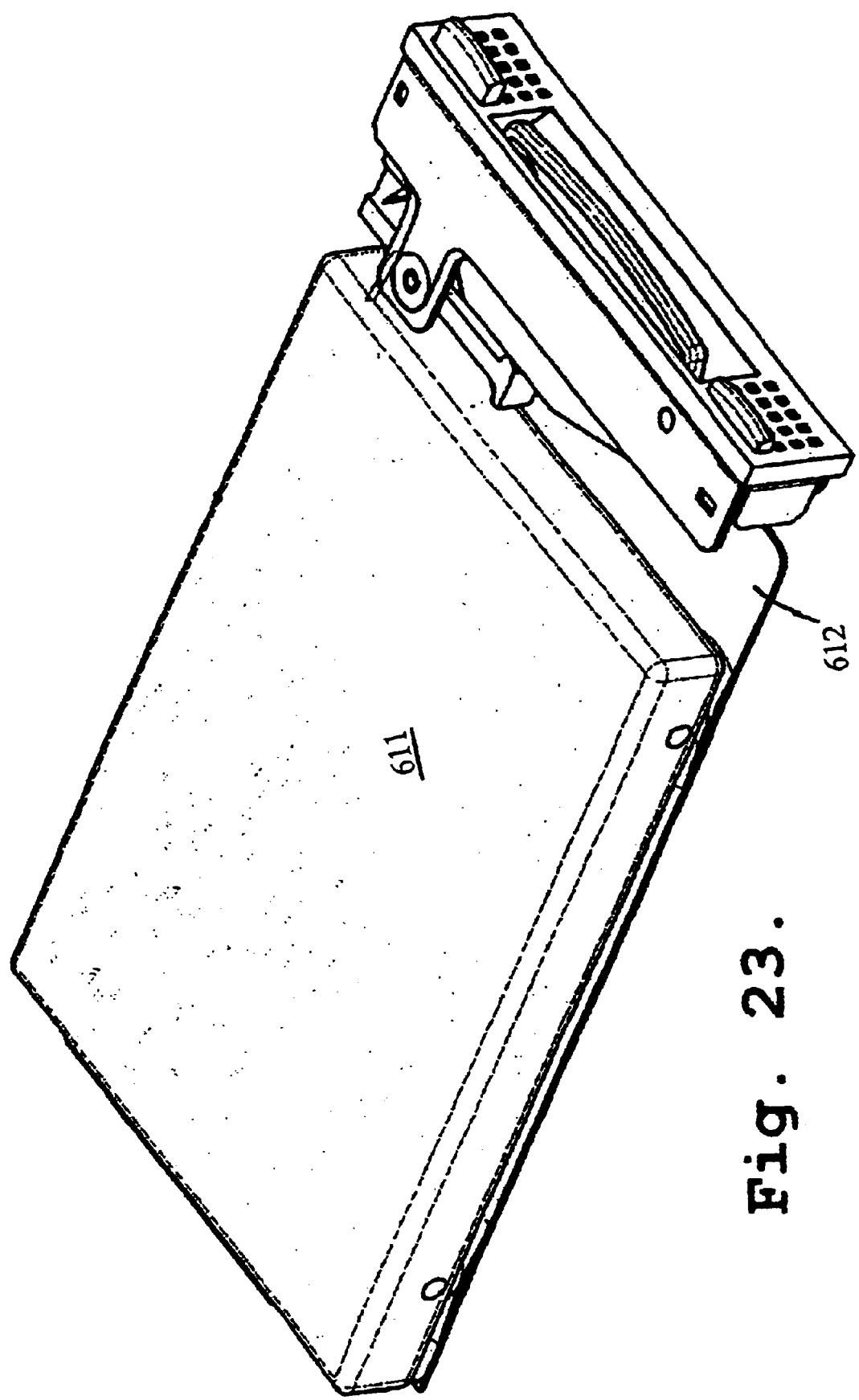
FIG. 23 is a front perspective drawing of one of the Serial ATA disk data storage devices and one the sleds or trays of the modular data storage device assembly of FIG. 18.
Figure 24:
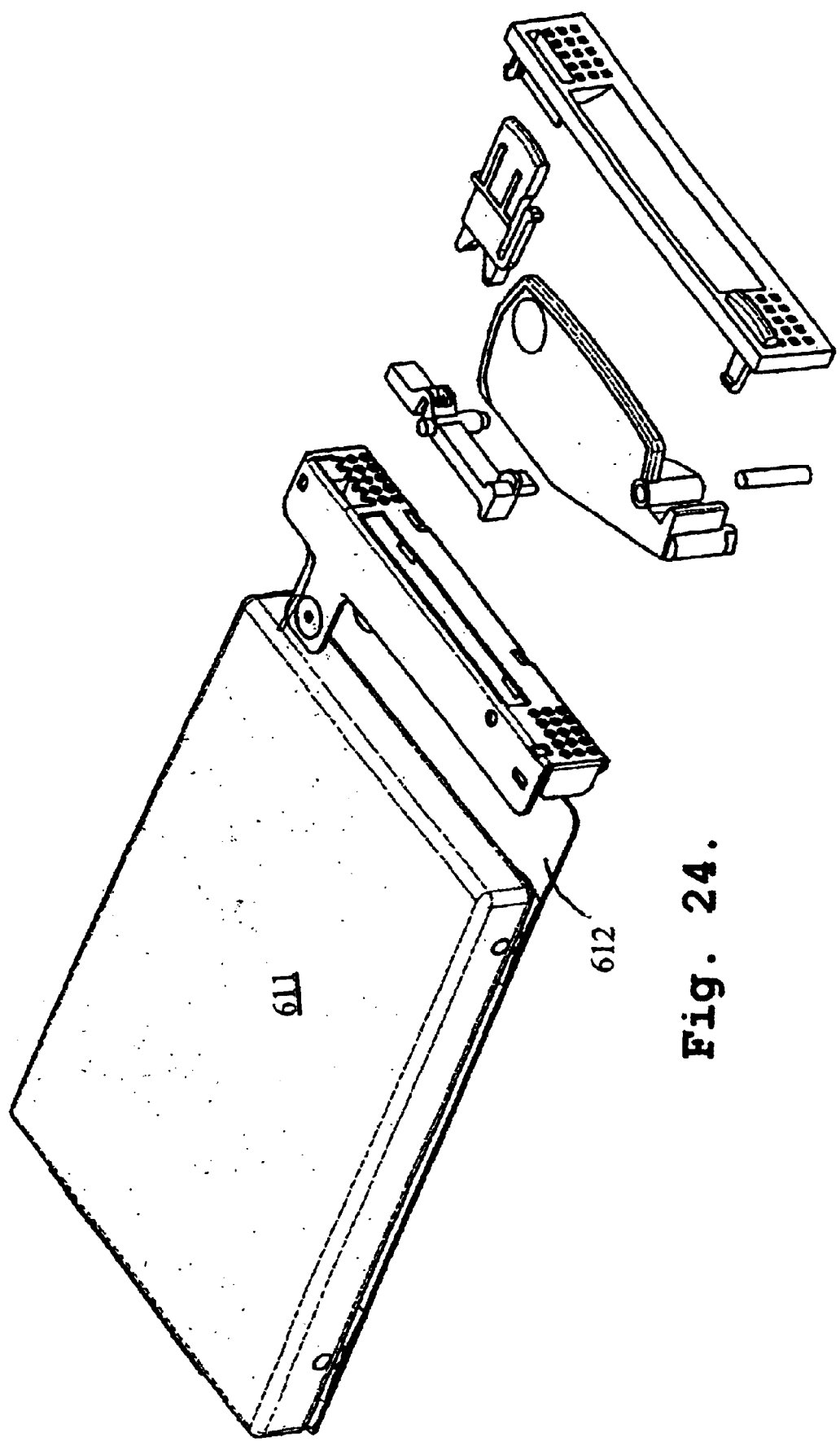
FIG. 24 is an exploded front perspective drawing of one of the Serial ATA disk data storage devices and one the sleds or trays of the modular data storage device assembly of FIG. 18.

Referring to FIG. 23 in conjunction with FIG. 18 and FIG. 24 each of the six Serial ATA disk data storage devices 611 and each of the six trays 612 of the modular data storage device assembly 610 are shown.

In the perfect embodiment, the modular data device assembly 110 utilizes plug in connector so that replacement of any of its components is simply a matter of plugging the component out of the drive bay or slot to disengage the interfacing connectors, and replacing the defective component with a new component that merely has to be plugged in. The modular data device assembly 110 easily adapts to the millions of computers already in use. The storage capacity of each of those computers is increased many fold without requiring rewiring or physical modification. The reliability of operation of this computer now equipped with the modular data device assembly 110 improves by virtue of the implementation of RAID technology to the modular data device assembly. The modular data device assembly enhances the data storage of the conventional computer without major investments in modification of hardware of software.

U.S. Pat. No. 6,098,114 teaches a high-performance RAID technology for a computer. The computer includes a controller card and an array of disk data storage devices 36. The controller card controls the disk data storage devices 122. The controller card includes an array of automated controllers for the disk data storage device. Each automated disk data storage device controller controls one respective disk data storage device 122. The controller for the disk data storage device is connected to a micro-controller by a control bus and are connected to an automated coprocessor by a packet-switched bus. The coprocessor accesses system memory and a local buffer. In operation, the controllers of the disk data storage device respond to controller commands from the micro-controller by accessing their respective disk data storage devices 122 and by sending packets to the coprocessor over the packet-switched bus. The packets carry input/output data (in both directions, with the coprocessor filling-in packet payloads on input/output writes), and carry transfer commands and target addresses. The coprocessor uses transfer-commands and target addresses to access the buffer and system memory. The packets also carry special completion values (generated by the micro-controller) and input/output request identifiers that are processed by a logic circuit of the coprocessor to detect the completion of processing of each input/output request. The coprocessor grants the packet-switched bus to the disk drive controllers using a round robin arbitration protocol that guarantees a minimum input/output bandwidth to each disk drive. This minimum input/output bandwidth is preferably greater than the sustained transfer rate of each disk drive, so that all drives of the array can operate at the sustained transfer rate without the formation of a bottleneck.

In the modular data device assembly one or more hard drives can be mounted within the housing that has an appropriate exterior dimension for insertion into a conventional industry standard size expansion bay of a computer. By use of a single expansion bay, the present invention expands the storage capacity of a computer by many times. As a result the present invention provides a modular data device assembly that can be used with a conventional computer without any modification. The modular data device assembly uses multiple data devices, such as disk drives that can be accessed in parallel in order to exploit the raid concept. Failures of individual data devices can be rectified by replacement of the modular data device. Failure on the entire data device assembly is rectified by replacement of the entire assembly.

From the foregoing it can be seen that a modular data device assembly for a disk data storage devices has been described. In the description, specific materials and configurations have been set forth in order to provide a more complete understanding of the present invention.

Accordingly it is intended that the foregoing disclosure be considered only as an illustration of the principle of the present invention.

What is claimed is:

1. A modular data device assembly comprising:
   a. a chassis with an open front and a back and with exterior dimensions corresponding to the dimensions of an industry standard drive bay;
   b. a plurality of slots disposed inside said chassis;
   c. a plurality of serial ATA data storage devices each of which is disposed in one of said plurality of slots;
   d. a back-plane being disposed in the back of said chassis and having a plurality of serial ATA connectors each of which is connected to one of said serial ATA data storage devices; and
   e. a power source connector mechanically and electrically coupled to said back-plane.

2. A modular data device assembly comprising:
   a. housing with an open front and a back and with exterior dimensions corresponding to the dimensions of an industry standard drive bay;
   b. six pairs of slots disposed inside said housing;
   c. six removable sleds in one of said six pairs of slots;
   d. six serial ATA data storage devices each of which is disposed on one of said six removable sleds;
   e. a back-plane being disposed in the back of said housing and having a plurality of serial ATA connectors each of which is connected to one of said six serial ATA data storage devices; and
   f. a power source connector mechanically and electrically coupled to said back-plane.

3. A modular data device assembly according to claim 2 wherein said modular data device assembly may be placed in a tower computer.

4. A modular data device assembly according to claim 2 wherein said modular data device assembly is placed in an external box.

5. Three modular data device assemblies according to claim 2 wherein said three modular data device assemblies are placed in a one-unit rack-mount computer enclosure.

6. A modular data device assembly according to claim 2 wherein said modular data device assembly may be placed in a rack-mount computer.

* * * * *